(12) United States Patent
Kondo et al.

(10) Patent No.: US 6,341,004 B1
(45) Date of Patent: *Jan. 22, 2002

(54) LIQUID CRYSTAL DISPLAY DEVICE WITH COMMON ELECTRODE ARRANGEMENT

(75) Inventors: Katsumi Kondo, Katsuta; Hiromu Terao, Mito; Hidetoshi Abe; Masuyuki Ohta, both of Katsuta, all of (JP); Kenkichi Suzuki, Oxford (GB); Tohru Sasaki; Genshiro Kawachi, both of Hitachi (JP); Junichi Ohwada, Mobara (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/543,337

(22) Filed: Apr. 5, 2000

Related U.S. Application Data

(63) Continuation of application No. 08/908,184, filed on Aug. 7, 1997, now Pat. No. 6,124,915, which is a continuation of application No. 08/744,451, filed on Nov. 6, 1996, now Pat. No. 5,737,051, which is a continuation of application No. 08/123,472, filed on Sep. 20, 1993, now Pat. No. 5,598,285.

(30) Foreign Application Priority Data

Sep. 18, 1992 (JP) .............................................. 4-249938
Jan. 20, 1993 (JP) .............................................. 5-007355

(51) Int. Cl.$^7$ ............................................. G02F 1/1343
(52) U.S. Cl. ..................................................... 349/141
(58) Field of Search ............................ 349/141, 38, 39

(56) References Cited

U.S. PATENT DOCUMENTS

| 4,345,249 A | | 8/1982 | Togashi |
| 5,182,620 A | * | 1/1993 | Shimada et al. ............... 257/72 |
| 5,365,079 A | | 11/1994 | Kodaiva et al. |
| 5,598,285 A | * | 1/1997 | Kondo et al. ................ 349/141 |
| 5,737,051 A | * | 4/1998 | Kondo et al. ................ 349/141 |
| 6,124,915 A | * | 9/2000 | Kondo et al. ................ 349/141 |

FOREIGN PATENT DOCUMENTS

| EP | 0 414 358 | 2/1991 |
| FR | 2 546 324 | 11/1984 |
| JP | 62-257130 | 11/1987 |
| JP | 2-300719 | 12/1990 |

* cited by examiner

*Primary Examiner*—Kenneth Parker
(74) *Attorney, Agent, or Firm*—Antonelli, Terry, Stout & Kraus, LLP

(57) ABSTRACT

A liquid crystal display device including a pair of substrates, a liquid crystal layer interposed between the pair of substrates, a plurality of first common electrodes extending in a direction and being formed on one substrate of the pair of substrates, and a second common electrode connected to one of the first common electrodes. The second common electrode has a first edge adjacent the one of the first common electrodes and a second edge opposite to the one of the first common electrode. A first pixel electrode is formed between two of the first common electrodes and extends in the same direction as the first common electrodes. A second pixel electrode overlaps the second common electrode, is connected to the first pixel electrode, and covers at least a portion of the first edge of the second common electrode.

10 Claims, 14 Drawing Sheets

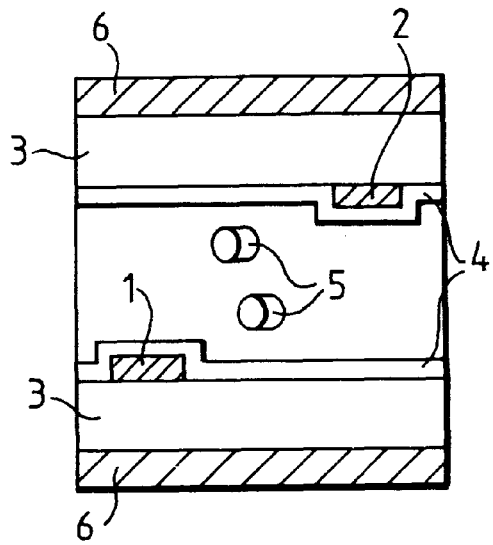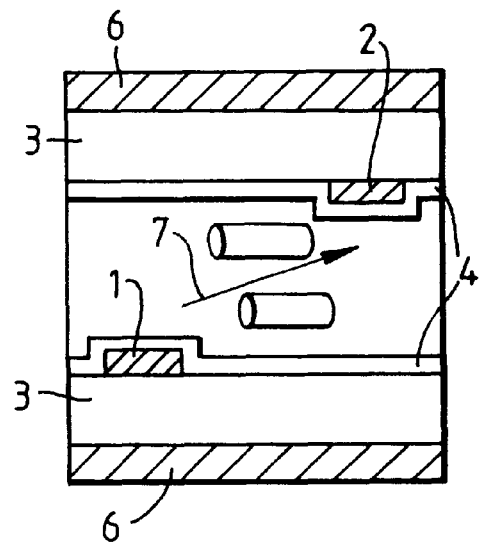
Fig.1(a)　　　　　Fig.1(b)
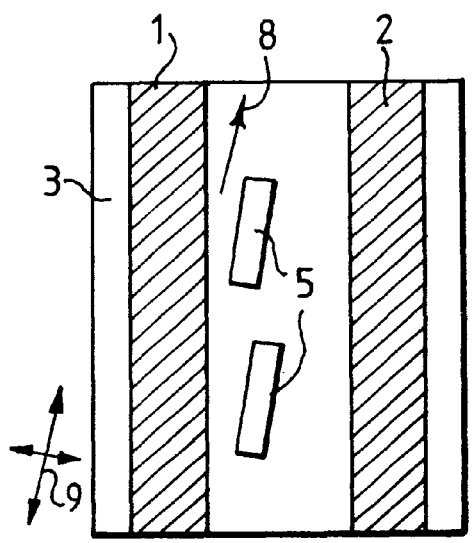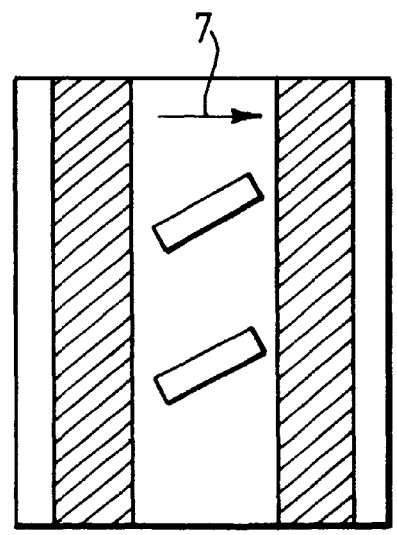
Fig.1(c)　　　　　Fig.1(d)

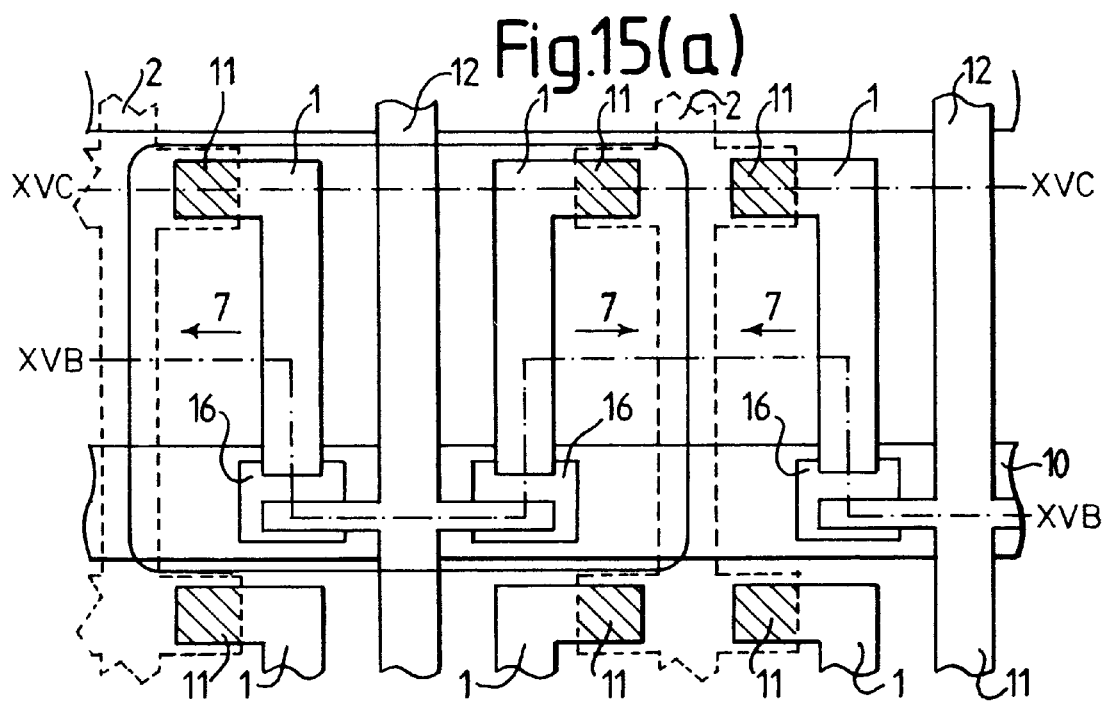
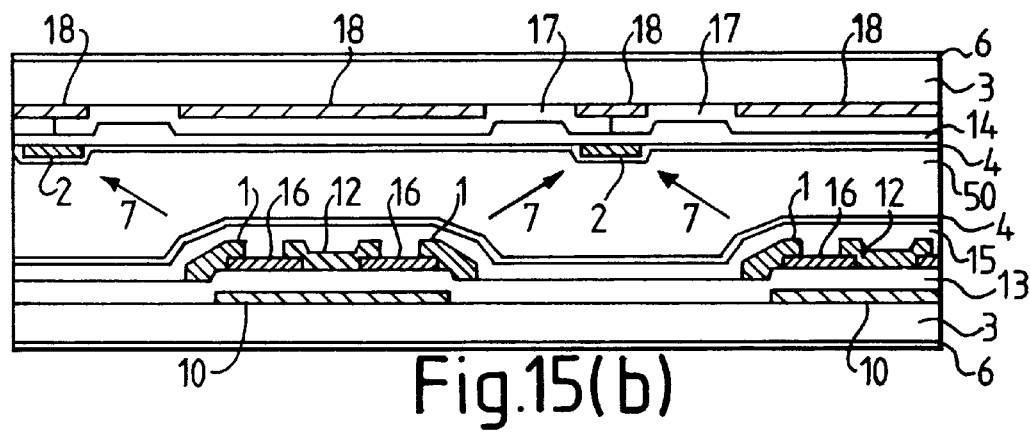
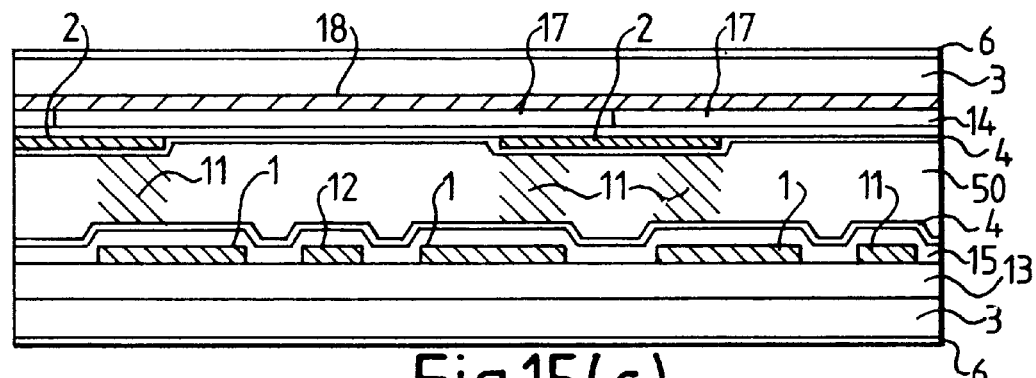

LIQUID CRYSTAL DISPLAY DEVICE WITH COMMON ELECTRODE ARRANGEMENT

CROSS REFERENCE TO RELATED APPLICATION

This is a continuation of U.S. application Ser. No. 08/908,184, filed Aug. 7, 1997, now U.S. Pat. No. 6,124,915, which is a continuation of U.S. application Ser. No. 08/744,451, filed Nov. 6, 1996, now U.S. Pat. No. 5,737,051, which is a continuation of U.S. application Ser. No. 08/123,472, filed Sep. 20, 1993, now U.S. Pat. No. 5,598,285, the subject matter of which is incorporated by reference herein.

BACKGROUND OF THE INVENTION

The present invention relates to a liquid crystal display device having at least one, and preferably a plurality of pixel elements.

In a standard liquid crystal display device, the pixel element is formed in a liquid crystal layer (normally common to the pixel elements) extending in a plane, and there is at least one polarizing arrangement parallel to the plane of the liquid crystal layer. By applying electrical signals to the liquid crystal layer using suitable electrodes, it is possible to vary the angle of polarization of polarized light passing through the liquid crystal layer, and thereby to vary the optical transmissivity of a liquid crystal display device with the change in polarization relative to the polarizing arrangement. Normally, in such a liquid crystal display device, the polarizing arrangement is formed by two polarizing plates, one on each side of the liquid crystal layer, but it is also possible to provide an arrangement with a single polarizing plate on one side of the liquid crystal layer and a reflective element on the other side of the liquid crystal element.

In standard liquid crystal display devices, electrical fields are generated by electrodes arranged perpendicular to the plane of the liquid crystal layer. Therefore, if the change in the liquid crystal layer due to the electric fields is to be visible, the size of those electrodes needs to be large; and, therefore, it is necessary to use transparent electrodes. Furthermore, at least two layers are normally needed between the transparent electrodes on each side of the liquid crystal layer and the liquid crystal layer itself. One such layer forms an orientation layer for the liquid crystal layer, but a further insulating layer is then needed between the orientation layer and the transparent electrode.

In International Patent Application No. PCT WO91/10936, a liquid crystal display device was disclosed in which electrical signals were applied to the Liquid crystal layer so as to generate electric fields having components in a direction parallel to the plane of the liquid crystal layer. Such parallel field components cause reorientation of the molecules of the liquid crystal layer, thereby varying the optical transmissivity of the liquid crystal display device.

In PCT WO91/10936, it was proposed that the electrodes for applying such field were, for each pixel element, in the form of combs, the teeth of the comb formed by one electrode extending into the spaces between the teeth of the comb formed by the other electrode. The teeth of each electrode were electrically connected in common, and a voltage was applied between the electrodes.

JP-B-63-21907 (1988) also disclosed a liquid crystal display device in which electrical signals were applied to the liquid crystal layer so as to generate electric fields having components in a direction parallel to the plane of the liquid crystal layer. As in PCT WO91/10936, the electrodes for applying such fields were, for each pixel element, in the form of combs. Use of comb-shaped electrodes was also disclosed in U.S. Pat. No. 4,345,249.

In each of these known arrangements, each pixel element has first and second electrodes of comb shape, with the teeth of one comb extending between the teeth of the other comb. Voltages are then applied to the electrodes by a suitable control circuit. It is important to note that the teeth of the comb-shaped electrodes are not electrically independent, so that the size of the pixel is determined by the size of the comb-shaped electrode.

The principles of operation of such devices, with comb shaped electrodes, is also discussed in an article entitled "Field Effects In Nematic Liquid Crystals Obtained With Interdigital Electrodes" by R. A. Soref in the Journal of Applied Physics, pages 5466 to 5468, vol. 45, no. 12 (December 1974), and in an article entitled "Interdigital Twisted-Nematic-Displays" by R. A. Soref, published in the Proceedings of the IEEE, pages 1710 to 1711 (December 1974).

SUMMARY OF THE PRESENT INVENTION

In the standard liquid crystal display devices discussed above, it is necessary to use transparent electrodes, which are formed on facing surfaces of two substrates. However, in order to form such transparent electrodes, it is necessary to use a vacuum manufacturing operation, such as sputtering, and thus the cost of manufacture of such standard liquid crystal display devices is high. Furthermore, it has been found that such transparent electrodes have vertical geometrical irregularities, of the order of several tens of nanameters, which prevents precise manufacture of active devices, such as thin film transistors needed to control the signals to the electrodes. Also, it has been found that parts of such transparent electrodes may become detached, to cause point or line defects. Thus, it has proved difficult to manufacture liquid crystal devices both reliably and cheaply.

Such conventional liquid crystal display devices also have disadvantages in terms of picture quality. The problem of vertical geometrical irregularities in the transparent electrodes has been mentioned above, but similar irregularities around the controlling transistors may result in orientation failure domains being formed, requiring a light shielding film to cover such transistor devices, reducing the light utilization efficiency of the liquid crystal device. Also, such conventional liquid crystal display devices have the disadvantage that there is a significant change in brightness when the visual angle is changed, and reversion of some gradation levels can occur in a half-term display, at some view angles.

Although the use of comb shaped electrodes, such as previously discussed, involves the need for transparent electrodes, further problems have been found. While the use of such comb-shaped electrodes offers theoretical advantages, those are limited by practical consideration which have to be taken into account when the comb-shaped electrodes are used. If the teeth of such comb-shaped electrodes have a width of 1 to 2 micrometers, satisfactory practical operation can be achieved. However, it is extremely difficult to form such fine teeth over a large substrate without defects. Thus, in practice, the aperture factor of the liquid crystal display device is reduced, because of the need to provide relatively wide electrode teeth. There is thus a trade-off between aperture factor and production yield, which is undesirable.

Therefore, the present invention seeks to provide a liquid crystal display device which is more suitable for mass production than the known liquid crystal display devices discussed above. The present invention has several aspects.

In the liquid crystal display device according to the present invention there are features which are common to all the aspects. The device has a liquid crystal layer, and at least one polarizing arrangement, which is normally provided in the form of a pair of polarizing plates disposed on opposite sides of the liquid crystal layer. The device has at least one, and normally a plurality, of pixel elements and there are electrodes which receive electrical signals for controlling the optical transmissivity of light through the device. As in e.g. JP-B-63-21907 (1988) discussed above, the electrical signals are applied such that electrical fields are generated in the liquid crystal layer with components parallel to the plane of the liquid crystal layer. The various aspects of the present invention, which will be discussed below, then relate to the electrode arrangement of a pixel element(s) and also to the materials and optical arrangements of the materials of the liquid crystal display device.

In a first aspect of the present invention, each pixel element has a pixel electrode extending in a first direction within the pixel, and there are also signal wiring electrodes extending in the same direction over several of the pixel elements. There are also common electrodes extending in that first direction over more than one of the pixel elements.

There may be a pair of pixel electrodes for each pixel element, with the signal wiring electrodes then extending between a pair of pixel electrodes at each pixel element. There is then a pair of common electrodes, with the pair of pixel electrodes being disposed therebetween, so that electrical fields are generated in opposite directions for each pixel element.

Preferably, all the electrodes are on the same side of the liquid crystal layer. Arrangements are also possible, however, in which the common electrodes are on the opposite side of the liquid crystal layer formed the other electrodes. In either case, if there is insulating material between the common electrode and the pixel electrode for each pixel element, a capacitive device may be formed therebetween.

In practice, it is possible for the common electrodes to be provided in common for two adjacent pixel elements, by interacting with pixel electrodes on opposite sides of each common electrode.

In a second aspect of the present invention, each pixel can be considered to have a elongate transistor element extending in a first direction, that elongate transistor element having at least one elongate electrode. There is also at least one elongate common electrode extending in the same direction as the elongate transistor element. In the second aspect, an insulating film separates the at least one elongate electrode of the elongate transistor element and the at least one common electrode.

In a third aspect of the present invention, each pixel has again an elongate transistor element extending in one direction, and at least one elongate common electrode extending in the same direction. The elongate transistor element has at least one elongate electrode, and there is an insulating film extending over and in direct contact with that at least one elongate electrode. That insulating film is also in direct contact with the liquid crystal layer. Preferably, that insulating film is an organic polymer.

In a fourth aspect of the present invention, each pixel can be considered to have a transistor element with a pair of first electrodes (pixel electrodes), a signal electrode between the first electrodes, and a gate electrode. The first and second electrodes extend in a common direction, as do a pair of common electrodes. A transistor element is then (in plan) disposed between the pair of common electrodes. As has previously been mentioned, the common electrodes and the transistor element may be on the same side of the liquid crystal layer, or they may be on opposite sides.

In a fifth aspect, for any one pixel element, each one of said pairs of common electrodes thereof forms a corresponding one of said pair of common electrodes for pixel elements adjacent to said any one pixel element.

The five aspects of the present invention discussed above all relate to an electrode arrangement of the liquid crystal display device. The aspects of the invention to be discussed below relate to the optical arrangement and materials of the liquid crystal display device.

In a sixth aspect of the present invention, the angles between components of electric fields in a direction parallel to the plane of said liquid crystal layer and the direction of orientation of molecules at opposite surfaces of the liquid crystal layer are the same, and the product of the thickness of the liquid crystal layer and the refractive index anisotropy of the liquid crystal layer is between 0.21 $\mu$m and 0.36 $\mu$m.

In a seventh aspect of the present invention, the absolute value of the difference between the angles between components of electric fields in a direction parallel to the plane of said liquid crystal layer and the direction of orientation of molecules at opposite surfaces of the liquid crystal layer is not less than 80° and not greater than 100°, and the product of the thickness of the liquid crystal layer and the refractive index anisotropy of the liquid crystal layer is between 0.4 $\mu$m and 0.6 $\mu$m.

In an eighth aspect of the present invention, the dielectric constant anisotropy of the liquid crystal layer is positive, and the absolute value of the angle between components of the electric fields in a direction parallel to the plane of said liquid crystal layer and the direction of orientation of molecules at the surface of the liquid crystal layer is less than 90°, but not less than 45°.

In a ninth aspect of the present invention, the dielectric constant anisotropy of the liquid crystal layer is negative, and the absolute value of the angle between components of the electric fields in a direction parallel to the plane of said liquid crystal layer and the direction of orientation of molecules at the surface of the liquid crystal layer is greater than 0°, but not greater than 45°.

In a tenth aspect of the present invention, the dielectric constant anisotropy of the liquid crystal layer is positive, and the value of the difference between: i) the angle between components of the electric fields in a direction parallel to the plane of said liquid crystal layer and the direction of orientation of molecules at the surface of the liquid crystal layer; and ii) the angle of the polarization axis of said at least one polarizing plate and said components of the electric fields in a direction parallel to the plane of said liquid crystal layer, is 3° to 15°.

In an eleventh aspect of the present; invention, the dielectric constant anisotropy of the liquid crystal layer is negative, and the value of the difference between i) the angle of the polarization axis of said at least one polarizing plate and said components of the electric fields in a direction parallel to the plane of said liquid crystal layer, and ii) the angle between components of the electric fields in a direction parallel to the plane of said liquid crystal layer and the direction of orientation of molecules at the surface of the liquid crystal layer, is 3° to 15°.

In a twelfth aspect of the present invention, the is direction of orientation of molecules of said liquid crystal layer at a surface of said liquid crystal layer parallel to the plane of said liquid crystal layer and said surface is not more than 4°.

Although various aspects of the present invention have been discussed above, a liquid crystal display device embodying the present invention may incorporate combinations of such aspects. Depending on the resulting combination, the present invention provides advantages in the manufacture and/or operation of a liquid crystal display device, and these advantages will be discussed in more detail later.

BRIEF DESCRIPTION OF THE DRAWINGS

Embodiments of the present invention will now be described in detail, by way of example, with reference to the accompanying drawings, in which:

FIGS. 1(a) to 1(d) are schematic diagrams illustrating the behavior of liquid crystal molecules in a liquid crystal display device according to the present invention;

FIG. 15(a) is a plan view and FIGS. 15(b) and 15(c) are sectional views of a fourth embodiment in which a capacitive device is formed between a common electrode and the pixel electrode on the respective facing interfaces of the substrates;

DETAILED DESCRIPTION

Before describing embodiments of the present invention, the general principles underlying the present invention will be explained.

Figure 6:
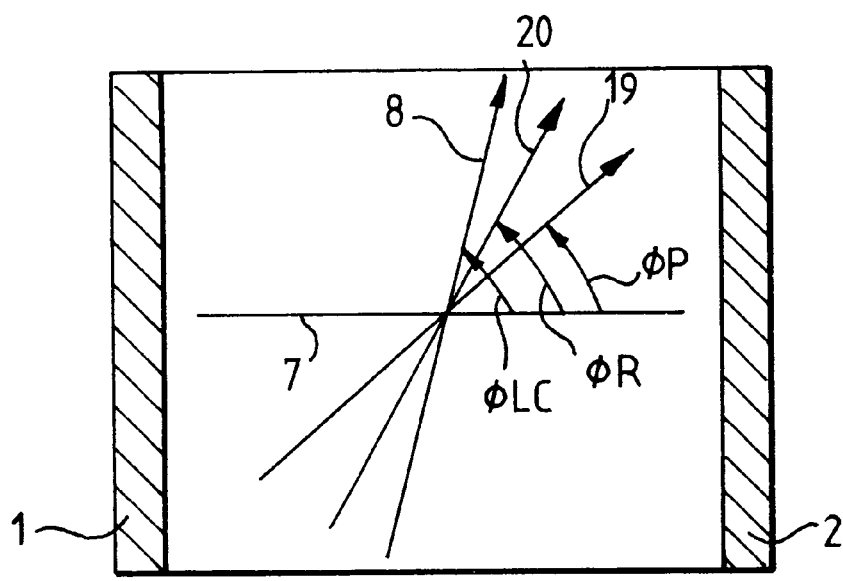
FIG. 6 is a diagram illustrating the angles formed by the long axis orientation direction of the liquid crystal molecules at the interface of the polarizing axis of the polarizing plate, and the phase advance axis of the phase difference plate, with respect to the direction of the electric field.

First, suppose that the angle of a polarized light transmission axis of the polarized plate with respect to the direction of the electric field is $\phi_P$, the angle of the longitudinal axis (optical axis) of liquid crystal molecules near the interface with respect to the electric field is $\phi_{LC}$, and the angle of the phase advance axis of the phase difference plate inserted between the pair of polarizing plates with respect to the electric field is $\phi_R$, as shown in FIG. 6. Because there are normally pairs of polarizing plates and liquid crystal interfaces, i.e. upper and lower plates and interfaces, these are represented as $\phi_{P1}$, $\phi_{P2}$, $\phi_{LC1}$ and $\phi_{LC2}$. FIG. 6 corresponds to a top view of FIG. 1, to be described later.

Next, the operation of embodiments of the present invention will be described with reference to FIGS. 1(a) to 1(d).

FIGS. 1(a) and 1(b) are side cross sections showing the operation of a liquid crystal display device according to the present invention. FIGS. 1(c) and 1(d) are front views of the liquid crystal display device. In FIGS. 1(a) to 1(d), the thin film transistor device is omitted. In this invention, stripes of electrodes are used to form a plurality of pixels, but FIGS. 1(a) to 1(d) show the structure of only one pixel (one cell). The side cross section of the cell when no voltage is applied is shown in FIG. 1(a), and the top view is shown in FIG. 1(c).

Linear electrodes 1, 2, are formed on the inner sides of paired transparent substrates 3, over which an orientation control film 4 is applied and subjected to an orientation processing. A liquid crystal is held between the paired substrates 3. Bar shaped liquid crystal molecules 5 of the liquid crystal are oriented so that they are at a slight angle to the longitudinal direction of the electrodes 1, 2, i.e. 45 degrees$\leq \phi_{LC}<$90 degrees, when no electric field is applied. This discussion assumes that the orientation directions of the liquid crystal molecules on the upper and lower interfaces are parallel to each other, i.e. $\phi_{LC1}=\phi_{LC2}$. It is also assumed that the dielectric constant anisotropy of the liquid crystal is positive.

When an electric field 7 is applied, the liquid crystal molecules 5 change their directions and are aligned with the direction of the electric field 7, as shown in FIGS. 1(b) and 1(d). By arranging the polarizing plates 6 at a specified angle 9, it is possible to change the light transmission factor when the electric field is applied. Thus, it is possible to provide a display having a contrast without using transparent electrodes.

In FIG. 1(b), the angle between the substrate surface and the direction of the electric field looks large and it seems not to be parallel to the substrates. In reality this is the result of magnifying the thickness direction in FIG. 1(b) to facilitate illustration, and the angle is actually less than 20 degrees.

In the following description, the electric fields having an inclination of less than 20 degrees are generally referred to as lateral electric fields. FIGS. 1(a) and 1(b) show an arrangement in which the electrodes 1, 2, are provided separately on the upper and lower substrates, respectively. However, it is possible to arrange them on one substrate and produce the same effect. Because the wiring pattern is very fine and may therefore deform due to heal and/or external forces, arranging the electrodes on a single substrate is preferable because it permits a more precise alignment.

Although the dielectric constant anisotropy of the liquid crystal is assumed to be positive, it may be negative. In that case, the initial orientation of the liquid crystal is set so that the liquid crystal molecules have a slight angle $|\phi_{LC}|$ (i.e. 0 degree$<|\phi_{LC}|\leq$45 degrees) with respect to a direction perpendicular to the longitudinal direction of the electrodes 1, 2, (the direction of the electric field 7).

Advantages which may thus be achieved with the present invention will now be explained.

(1) The first advantage is that enhanced contrast may be achieved without using transparent electrodes.

There are two types of structure for producing contrast. The one utilizes a mode in which the orientations of the liquid crystal molecules 5 on the upper and lower substrates 3 are almost parallel to each other (since color interface by birefringent phase difference is used, this mode is called a birefringent mode). The other structure has a mode in which the orientations of the liquid crystal molecules S on the upper and lower substrates 3 cross each other, twisting the molecular orientation in the cell (since light spiraling produced by rotation of the polarization plane in the liquid crystal composition layer is used, this mode is called a light spiraling mode).

In the birefringent mode, when a voltage is applied, the molecular long axis 8 (optical axis) changes its direction in a plane almost parallel to the substrate interface, changing its angle with respect to the axis of a polarized plate (not shown in FIGS. 1(a) and 1(b)) which is set at a specified angle. This results in a change in the light transmission factor.

In the light spiraling mode, the application of a voltage similarly changes only the direction of the molecular long axis in the same plane. This mode, however, utilizes a change in the light spiraling as the spiral is unraveled.

Next, a structure for making the display colorless and increasing the contrast ratio will be explained below for two cases: one using the birefringent mode and the other using the light spiraling mode.

II. Displaying in the birefringent mode: generally, when a uniaxial birefringent medium is inserted between two orthogonal polarizing plates, the light transmission factor, $T/T_0$, is expressed as follows.

$$T/T_0 = \sin^2(2\chi_{eff}) \cdot \sin^2(\Pi d_{eff} \Delta n/\lambda) \qquad \text{Equation (1)}$$

In Equation 1, $\chi_{eff}$ is the effective direction of the light axis of liquid crystal composition layer (an angle between the light axis and the polarized light transmission axis), $d_{eff}$, is the effective thickness of the liquid crystal composition layer having birefringence, $\Delta n$ is the refractive index anisotropy, and $\lambda$ is the wave length of the light. In an actual cell the liquid crystal molecules are fixed at the interface and not all the liquid crystal molecules in the cell are parallel and uniformly oriented in one direction when an electric field is applied. Instead, they are significantly deformed particularly near the interface. It is therefore convenient to assume an apparent uniform state as the average of these states. In Equation 1, an effective value is used for the light axis direction of the liquid crystal composition layer.

To obtain a normally closed characteristic in which the display appears dark when a low voltage $V_L$ is applied and bright when a high voltage $V_H$ is applied, the polarizing plates should be arranged so that the light transmission axis (or absorption axis) of one of the polarizing plates is almost parallel to the orientation direction of the liquid crystal molecules (rubbing axis), i.e. $\phi_{P2} \approx \phi_{LC1} \approx \phi_{LC2}$. The light transmission axis of the other light polarizing plate is perpendicular to the first axis, i.e. $\phi_{P2}=\phi_{P1}+90°$. When no electric field is applied, since $\chi_{eff}$ in Equation 1 is zero, the light transmission factor $T/T_0$, is also zero. On the other hand, when an electric field is applied, the value of $\chi_{eff}$ increases in dependence on the intensity of the electric field and becomes maximum at 45 degrees. Then, if the light wavelength is assumed to be 0.555 $\mu$m, in order to make the light colorless and the light transmission factor maximum, the effective value of $d_{eff} \cdot \Delta n$ should be set to half of the wavelength, i.e. 0.28 $\mu$m. Actually, however, there is a margin in the value, and values between 0.21 $\mu$m and 0.36 $\mu$m are suitable, with the values between 0.24 $\mu$m and 0.33 $\mu$m being preferred.

On the other hand, in order to obtain normally open characteristics in which the display appears bright when a low voltage $V_L$ is applied and dark when a high voltage $V_H$ is applied, the polarizing plates should be arranged so that $\chi_{eff}$, in Equation 1 is almost 45° when no electric field is applied or an electric field of low intensity is applied. When an electric field is applied, the value $\chi_{eff}$ decreases in dependence on the field intensity as opposed to the case of the normally closed characteristic. However, because there is a residual phase difference in the liquid crystal molecules fixed near the interface even when $\chi_{eff}$ is minimum (i.e. zero), a significant amount of light will leak under this condition.

In an experiment conducted by the inventors of the present invention, in which the value of d·Δn was set between 0.27 and 0.37 and an effective voltage of 3 to 10 volts was applied, the residual phase difference on the interface was 0.02 to 0.06 μm. Hence, by inserting a phase difference plate having a birefringence phase difference of about 0.02 to 0.06 μm (this phase difference is represented as $R_f$) to compensate for the interface residual phase difference, the dark state becomes darker giving a high contrast ratio. The angle $\phi_R$ of the phase advance axis of the phase difference plate is set parallel to the effective light axis $\chi_{eff}$ of the liquid crystal composition layer when the voltage is applied.

To make the dark state be as black as possible, the angle of the phase advance axis should be aligned precisely with the residual phase difference that occurred when a voltage for displaying a dark state is applied. Therefore, to make the dark state compatible with the increased level of the transmission factor and the lightness of the bright state, the following relationship must be fulfilled $$0.21 \, \mu m < (d \cdot \Delta n - R_f) < 0.36 \, \mu m \quad \text{Equation (2)}$$

Or more preferably, $$0.23 \, \mu m < (d \cdot \Delta n - R_f) < 0.33 \, \mu m \quad \text{Equation (3)}$$

II. Displaying in the light spiraling mode: In a conventional twisted nematic (TN) system, when the value of d·Δn is set to around 0.50 μm, a first minimum condition, a high transmission factor and colorless light may be obtained. It has been found preferable to set the value in a range from 0.40 to 0.60 μm. The polarizing plates are arranged such that the transmission axis (or absorbing axis) of one of the polarizing plates is set almost parallel to the orientation direction (rubbing axis) of the liquid crystal molecules on the interface, i.e. $\phi_{LC1} \approx \phi_{LC2}$. To realize a normally closed type device, the transmission axis of the other polarizing plate is set parallel to the orientation direction of the liquid crystal molecules; and, for a normally open type, the transmission axis of the polarizing plate is set perpendicular to the orientation direction.

To eliminate light spiraling, it is necessary to set the orientation direction of the liquid crystal molecules near the upper and the lower substrate interfaces so that they are almost parallel to each other. If a 90° TN mode is assumed, the liquid crystal molecules on one of the substrates must be turned nearly 90°. However, in displaying in the birefringence mode, the liquid crystal molecules need only be turned about 45°. Furthermore, the birefringence mode has a lower threshold value.

(2) The second advantage is that the visual angle characteristics may be improved.

In the display mode, the long axes of the liquid crystal molecules are almost parallel to the substrate at all times and do not become perpendicular to the substrate, so that there is only a small change in brightness when the visual angle is changed. This display mode provides a dark state, not by making the birefringence phase difference almost zero by applying a voltage as in the case of a conventional display device, but by changing the angle between the long axes of the liquid crystal molecules and the axis (absorbing or transmission axis) of the polarizing plate. Thus, the display mode of the present invention differs fundamentally from that of the conventional device.

In a conventional TN type of liquid crystal display device in which the long axes of the liquid crystal molecules are perpendicular to the substrate interface, a birefringence phase difference of zero is obtained only in a visual direction perpendicular to the front or the substrate interface. Any inclination from this direction results in a birefringence phase difference, which means leakage of light in the case of the normally open type, causing reduction of contrast and reversal of tone levels.

(3) The third advantage is that there is improved freedom in the selection of the materials of the orientation film and/or the liquid crystal, and so the margin for the related process may thus be increased.

Since the liquid crystal molecules do not become erect, an orientation film for providing a large inclination angle (the angle between the long axis of the liquid crystal molecule and the interface of the substrate), which was used in a conventional device, is no longer necessary. In a conventional liquid crystal display device, when the inclination angle becomes insufficient, two states with different inclination directions and domains bordering the two states occur, raising the possibility of a poor display. Instead of having such an inclination angle, the display system of the present invention may have the long axis direction of the liquid crystal molecule (rubbing direction) on the substrate interface set in a specified direction different from 0° or 90° with respect to the electric field direction.

For example, when the dielectric constant anisotropy of the liquid crystal is negative, the angle between the electric field direction and the long axis direction of the liquid crystal molecule on the substrate interface $\phi_{LC}$ ($\phi_{LC}>0$) should exceed 0°, and normally should be more than 0.5°, preferably more than 2°. If the angle is to be set at exactly 0°, two kinds of deformations with different directions, and domains of two different states and their bordering are generated, and a possibility of deterioration in display quality occurs. If the angle is set to more than 0.5°, the apparent long axis direction of the liquid crystal molecule ($\phi_{LC}(V)$) increases uniformly with increasing intensity of the electric field, and there is no possibility of the long axis being inclined in the reverse direction, i.e. $\phi_{LC}(V)<0$.

With this system, since no domains occur even if the angle (inclination angle) between the interface and the liquid crystal molecule is small, it is possible to set the angle to have a small value. The smaller the inclination angle, the greater will be the process margin for rubbing, improving the uniformity of the liquid crystal molecule orientation. Hence, when the present process in which an electric field is supplied in parallel to the interface combines with a low inclination technique, the orientation of the liquid crystal molecule becomes more uniform, and display variations can be reduced much better than in a conventional system, even if there are variations of the same magnitude in the manufacturing process.

Generally, there are fewer kinds of orientation films that produce a high inclination angle than those which produce a small inclination angle. The present system increases the freedom in the selection of the orientation film material. For example, when an organic polymer is used for the flattening film disposed over the color filters and for the protective film disposed over the thin film transistors and is directly subjected to a surface orientation processing, such as rubbing, an organic film can be used with ease as the orientation film simultaneously because there is no need to provide an inclination angle. Hence, it becomes possible to simplify the process and to decrease the cost. In order to eliminate display irregularities due to variations in the manufacturing process, the inclination angle preferably is set below 4°, and more preferably below 2°.

Furthermore, freedom in the selection of the liquid crystal material can be increased. as will be explained below.

In accordance with the present invention, the pixel electrodes and the common electrodes may have a structure in which an electric field generally parallel to the interface of the substrate is applied to the liquid crystal composition layer. The distance between the electrodes can be chosen to be longer than the distance between the mutually facing transparent electrodes of the conventional vertical electric field active matrix type liquid crystal display device. The equivalent cross sectional area of the electrode can be made smaller than that of the conventional arrangement. Hence, the electric resistance between the paired pixel electrodes of the present invention can be significantly larger than that of the mutually facing transparent electrodes of the conventional active matrix liquid crystal display device.

Furthermore, the electrostatic capacitance between the pixel electrode and the common electrode of the present invention can be connected in parallel with capacitive devices, and the capacitive device having a high electrical resistance can be achieved. Therefore, the electrical charge accumulated in the pixel electrode can be held with ease, and sufficient holding characteristics can be achieved even if the area of the capacitive device is decreased. This area reduces the aperture factor and therefore needs to be small, if possible.

Conventionally the liquid crystal composition has an extremely high specific resistance, for instance $10^{12}$ $\Omega$cm. However, in accordance with the present invention, it is possible to use a liquid crystal composition having a lower specific resistance than the conventional one, without causing any problems. That means not only increased freedom for selection of the liquid crystal material, but also increases the margin for the processing. In other words, a defect in display quality rarely occurs even if the liquid crystal is contaminated during the processing. Thus, the margin for the previously described variation at the interface with the orientation film increases, and defects caused at the interfaces are rare. Consequently, processes such as inspection and ageing can be significantly simplified, and the present invention can contribute significantly to a lowering in the cost of thin film transistor type liquid crystal display devices.

Because the present invention permits the pixel electrode to have a more simple shape than the known comb shaped electrode, the efficiency of utilization of the light is increased. It is not necessary to sacrifice some of the aperture factor, as in conventional methods for obtaining a capacitive device which can accumulate a sufficient amount of electric charge. Replacement of the insulator for protecting the thin film transistors with an organic composition enables the dielectric constant to be lower than that when an inorganic composition is used, making it possible to suppress the electric field component generated in the vicinity of the pixel electrode in a vertical direction to the interface of the substrate to a value smaller than the electric field in a lateral direction. This enables the liquid crystal to operate in a wider region. It also contributes to an enhancement of brightness. When the common electrode is used in common as the electrode for adjacent pixel electrodes, it operates in the same way as the common electrode in the conventional active matrix type liquid crystal display device, but its structure can be simplified as compared with conventional arrangements, and the aperture factor can be further increased.

As there is increased freedom in the selection of materials for the liquid crystal, the orientation film and the insulator, it becomes possible to select insulating materials for the capacitive devices so that the product of their specific resistance and the dielectric constant is larger than that of the material of the liquid crystal. Then, one vertical scanning period in the driving signal output from the scanning wiring driving means can be set to be shorter than the time constant expressed by a product of the specific resistance and the dielectric constant of the insulator of the capacitive devices. Hence, the voltage variation at the pixel electrode can be reduced to a sufficiently small value.

(4) The fourth advantage is that a simple thin film transistor structure having a high aperture factor can be achieved, permitting enhancement of brightness.

Figure 7:
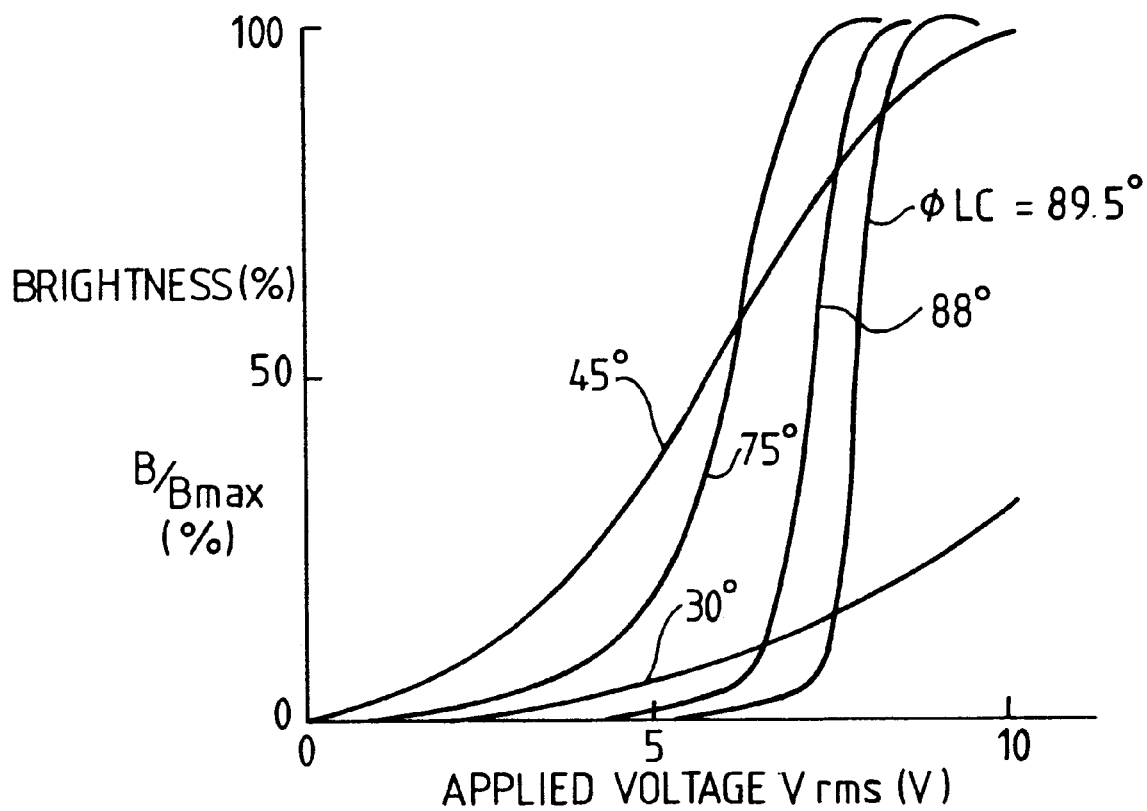
FIG. 7 is a graph illustrating the electro-optical characteristics of various embodiments with different orientation directions of the long axis of the liquid crystal molecules at the interface when the dielectric constant anisotropy is positive.

Consider the structure of a pixel including a thin film transistor, when comb shaped electrodes are used, as disclosed in JP-B-63-21907 (1988). There is then the problem that the aperture factor decreases significantly and the brightness is lowered. For mass production, the necessary width of one tooth of the comb shaped electrode is about 8 $\mu$m, with a minimum of at least 4 $\mu$m. Hence, it is impossible to form a pixel of 0.3×0.1 mm$^2$ for a diagonal length 9.4-inch (23.9 cm) color VGA class screen with a structure having a total of 17 teeth as shown in FIG. 7 of JP-B-63-21907 (1988).

The present invention permits a sufficient aperture factor to be maintained, without losing the described advantages (1) and (2) discussed above. Instead of structures, such as comb shaped electrodes, which inevitably reduce the aperture factor, the more simple structure of the electrode permits a practical high aperture factor to be achieved.

The first aspect of the invention discussed above relates to structures in which the common electrodes are formed on the mutually facing interfaces of substrates, or the pixel electrodes are formed on the same layer. In (JP-B-63-21907 (1988)), the directions of the signal wiring and the common electrode cross over at right angles to each other in order to form the comb shaped electrodes. That is, the signal wiring extends in a first direction (Y direction), and the common electrode extends in a direction perpendicular to the first direction (X direction). On the other hand, the present invention permits the avoidance of a complex structure, such as comb shaped electrodes by having the signal wiring, the pixel electrode and the common electrode all extending in a common direction. In order to reduce the threshold voltage of the liquid crystal and to shorten the response time, it is preferable to make the interval between the pixel electrode and the common electrode narrow. Locating the pixel electrode and the signal wiring electrode between a pair of common electrodes is also effective, and it is not necessary to use a complex structure, such as a comb shaped electrode.

The second aspect of the present invention also permits the structure to be simplified and the aperture factor increased by providing the pixel electrode and the common electrode in different layers separated from each other by an insulating layer. This aspect of the present invention differs substantially from JP-B-63-21907 (1988) in that the pixel electrode and the common electrode are provided in separated layers. One advantage of this is that the region for the additional capacitive device, which has been reduced by use of the lateral electric field system, can be further reduced. Thus, overlapping of the pixel electrode and the common electrode separated by an insulating film becomes possible because they are in separate layers, and the load capacitance can be formed in the region of overlap. The overlapping parts can be used as a part of the wiring for the common electrodes. Hence, it is not necessary to sacrifice a part of the display in order to form a capacitive device. Accordingly, the aperture factor for the pixel can be further increased.

Depending on a design of each pixel, a plurality of capacitive devices can be formed. Hence, the voltage holding characteristics may be significantly improved, and deterioration of the display quality rarely occurs, even if severe contamination of the liquid crystal and lowering of the off-resistance of the thin film transistor are experienced. Furthermore, the insulating film formed between the pixel electrode and the common electrode can be commonly used in common as a gate insulating film of the scanning wiring (gate line) in the same layer. Therefore, there is no need to form a further film, and a process step for providing separate layers is not necessary.

There are other advantages of the separate layers formed by insertion of the insulating film between the pixel electrode and the common electrode; for example, the probability of short-circuit failures between the pixel and common electrodes can be reduced significantly due to the existence of the insulating film therebetween, and accordingly, the probability of pixel defects can be reduced.

The common electrode and/or the pixel electrode, preferably have shapes forming a pattern which makes the aperture factor as large as possible. The pixel electrode or the common electrode has any of a number of flat shapes, such as a ring, a cross, a letter T, a letter Π, a letter I and a ladder. By suitably combining the selected shapes, the aperture factor can be increased significantly, as compared with the case using comb shaped electrodes.

Because the common electrode and the pixel electrode are in separate layers with an insulating film therebetween, it becomes possible to provide electrodes having shapes which overlap each other. Hence, the present invention permits an increase in the aperture factor. When the common electrode is composed of a metallic electrode having a surface which is coated with self-oxidized film or self-nitrized film, short-circuit failure between the common electrode and the pixel electrode can be prevented even if the two electrodes mutually overlap, so that the high aperture factor and the prevention of pixel defects are compatible.

Embodiments of the present invention will now be described in detail.

EMBODIMENT 1

Figure 2A:
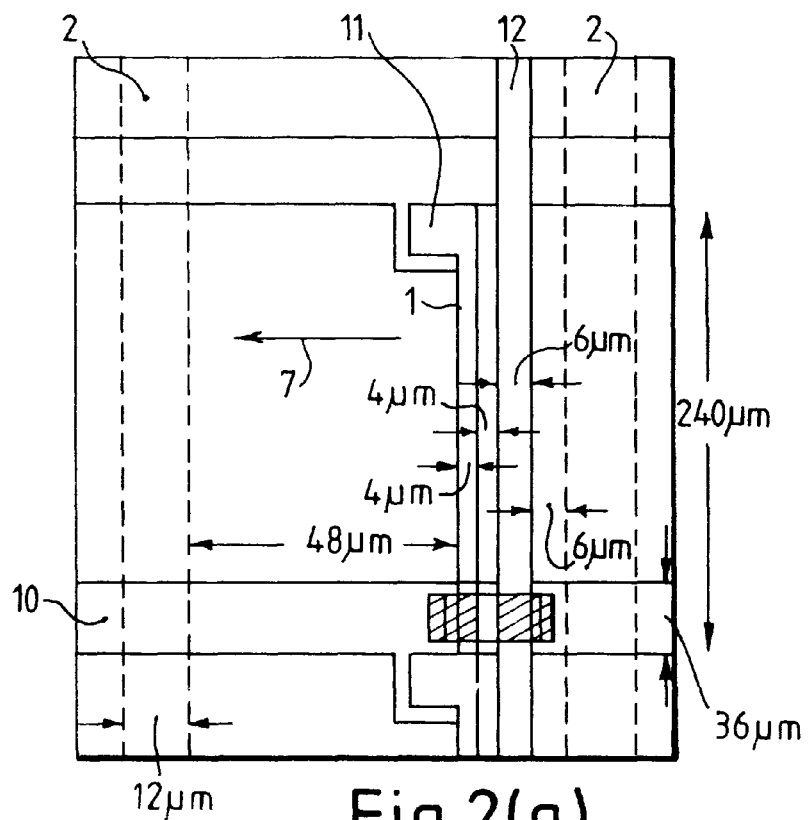
FIGS. 2(a) and 2(b) are plan and sectional views, respectively, of an embodiment, showing the structure of a thin film transistor, which may be used in the present invention.
Figure 2B:
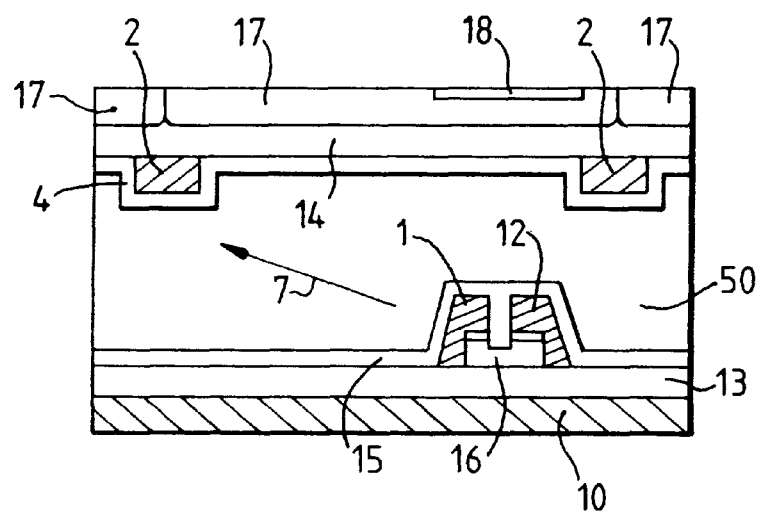

In the first embodiment shown in FIGS. 2(a) and 2(b), two glass substrates (not shown in FIG. 2(a) or 2(b) but as shown in FIGS. 1(a) to 1(d)) were used which were polished on the surfaces and 1.1 mm thick. Between these substrates was interposed a nematic liquid crystal which had a positive dielectric constant anisotropy $\Delta\epsilon$ of 4.5 and a birefringence $\Delta n$ of 0.072 (589 nm, 20 C°). A polyimide orientation control film applied over the substrate surface was subjected to a rubbing processing to produce a pretilt angle of 3.5 degrees. The rubbing directions of the upper and the lower interfaces were almost parallel and at an angle of 85 degrees ($\phi_{LC1}=\phi_{LC2}=85°$) with respect to the direction of the applied electric field.

A gap d was formed by dispersing spherical polymer beads between the substrates so that the gap became 4.5 μm when the liquid crystal was sealed. Hence, $\Delta n \cdot d$ was 0.324 μm. The resulting structure was clamped by two polarizing plates (not shown) (manufactured by e.g. Nitto Denko, with reference G1220DU). One of the polarizing plates had its polarized light transmission axis set almost parallel to the rubbing direction, i.e. $\phi_{P1}=85°$. The polarized light transmission axis of the other polarizing plate was set perpendicular to the former, i.e. $\phi_{P2}=-5°$. As a result, a normally closed characteristic was obtained.

The structure of the thin film transistor and various electrodes for one pixel element are as shown in FIG. 2(a) and FIG. 2(b), such that the thin film transistor device (hatched portion in FIG. 2(a)) has a pixel electrode (source electrode) 1, a signal electrode (drain electrode) 12, and a scanning electrode (gate electrode) 10. The pixel electrode 1 extends in a first direction (the vertical direction in FIG. 2), the signal electrode 12 and the common electrodes 2 extend in the first direction so as to cross over a plurality of pixels (the pixels being arranged vertically in FIG. 2), and the thin film transistor device is located between the common electrodes 2. The thin film transistor device is shielded from light by a light shield member 18.

Signal waves having information are supplied to the signal electrode 12, and scanning waves are supplied to the scanning electrode 10 synchronously. A channel layer 16 composed of amorphous silicon (aSi) and a thin film transistor formed from an insulating protective film 15 of silicon nitride (SiN) are arranged between adjacent common electrodes. Information signals are transmitted from the signal electrode 12 to the pixel electrode 1 through the thin film transistor, and a voltage is generated between the common electrode 2 and the liquid crystal 50.

In the present embodiment, the common electrodes 2 are arranged at the facing interface side of the substrate and are enlarged in the thickness direction in the illustration in FIG. 2(b). Therefore, although the electric field direction 7 shown in FIG. 2(b) appears to be inclined relative to the horizontal, the thickness of the liquid crystal layer 5 is actually about 6 μm as compared with the width of 48 μm, so that the inclination is very small and the supplied electric field direction is almost parallel to the interface of the substrate.

A capacitive device 11 was formed in a structure in which the protruded pixel electrode 1 and the scanning wiring 10 held a gate insulating film 13 therebetween as shown in FIG. 2(b). The electrostatic capacitance of the capacitive device 11 was about 21 fF. Each of the lines of the scanning wiring 10 and the signal wiring 12 were connected to a scanning wiring driving LSI, and a signal wiring driving LSI respectively.

Electric charge accumulates in the pixel electrode 1 to about 24 fF, which is the capacitance of the parallel connection of the electrostatic capacitance between the pixel electrode 1 and the common electrode 2 and that of the capacitive device 11. Therefore, even if the specific resistance of the liquid crystal 50 is $5 \times 10^{10}$ Ωcm, the voltage variation at the pixel electrode 1 could be suppressed, and deterioration of the display quality was prevented.

In this embodiment, the number of the pixels were 40 (×3) ×30, and the pixel pitch was 80 μm in a lateral direction (i.e. between the common electrodes) and 240 μm in a vertical direction (i.e. between the scanning electrodes). A high aperture factor of e.g. 50% was obtained, with the scanning electrode 10 being 12 μm wide and the interval between the adjacent scanning electrodes being 68 μm. Three stripe shaped color filters 17 forming respective red (R), green (G) and blue (B) filters were provided on the substrate facing the substrate supporting the thin film transistors.

A transparent resin 14 was laminated on the color filters 17 for surface flattening. The material of the transparent resin 14 is preferably an epoxy resin. An orientation control film 4, e.g. of the polyimide group, was applied to the transparent resin. A driving circuit was connected to the panel.

Figure 8:
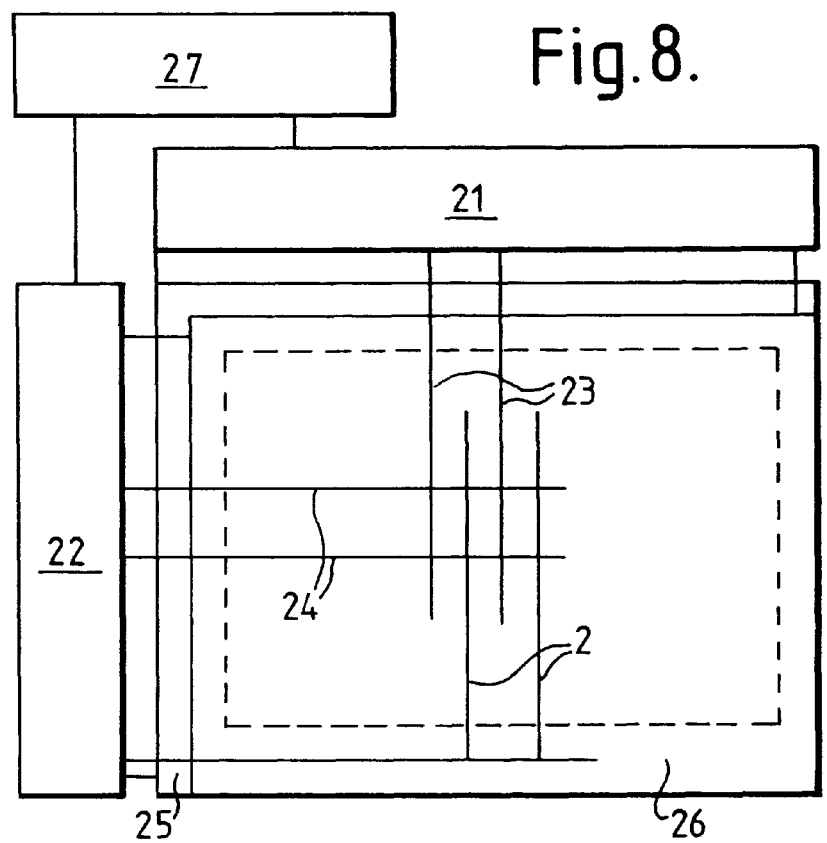
FIG. 8 illustrates schematically a liquid crystal display driving system which may be used in the present invention.
Figure 9:
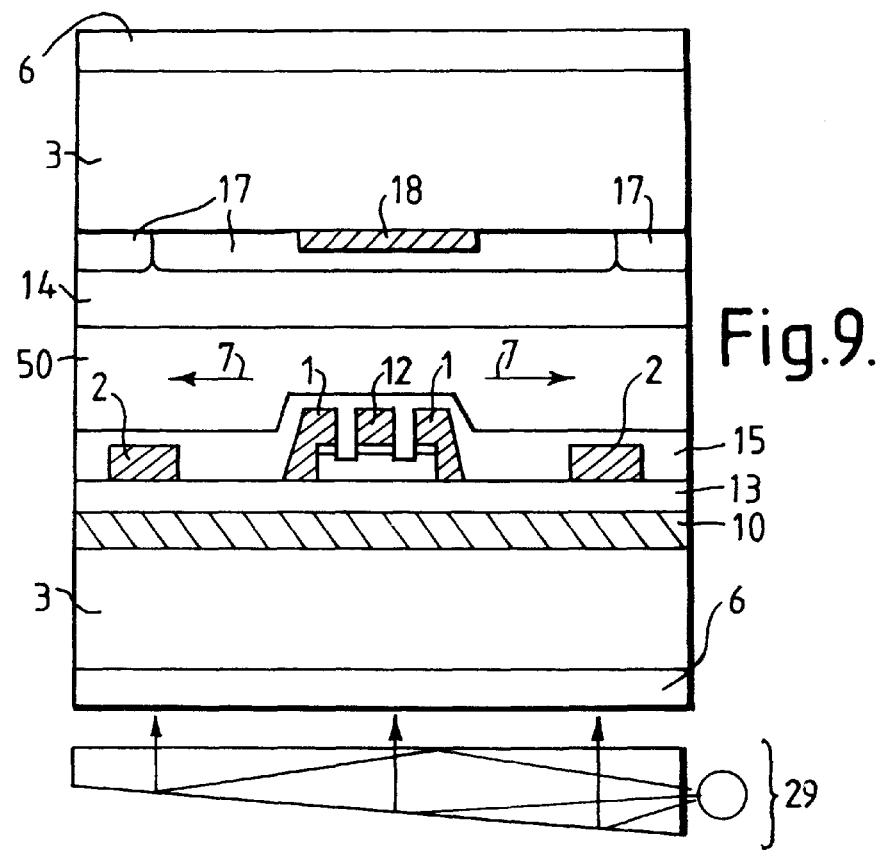
FIG. 9 illustrates an example of the present invention applied to a liquid crystal display transmission type optical system.
Figure 10:
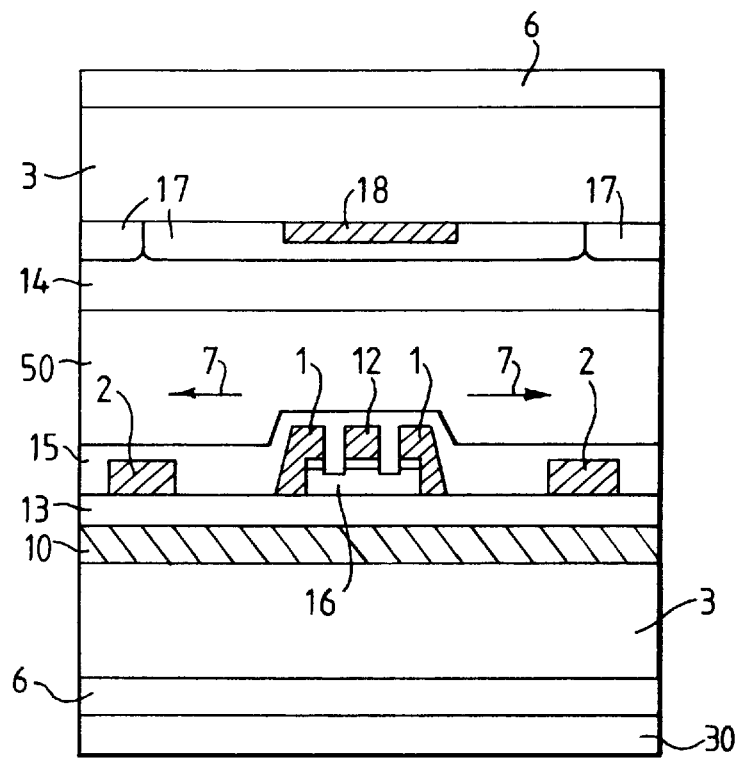
FIG. 10 illustrates an example of the present invention applied to a liquid crystal display reflection type optical system.

The structure of the driving system in the present embodiment is shown in FIG. 8. A signal electrode 23 and a common electrode 31 extend to the end of the display portion. FIGS. 9 and 10 show the structure of the optical systems needed, FIG. 9 being for a transmission type device and FIG. 10 being for a reflection type device with a reflector 30.

As the present embodiment does not need any transparent electrodes, the manufacturing process becomes simple, the production yield increases, and the manufacturing cost can be significantly reduced. In particular, there is no need for extremely expensive facilities having vacuum furnaces for forming the transparent electrodes, and there may thus be a significant reduction in investment in the manufacturing facilities, permitting an accompanying cost reduction.

Figure 3A:
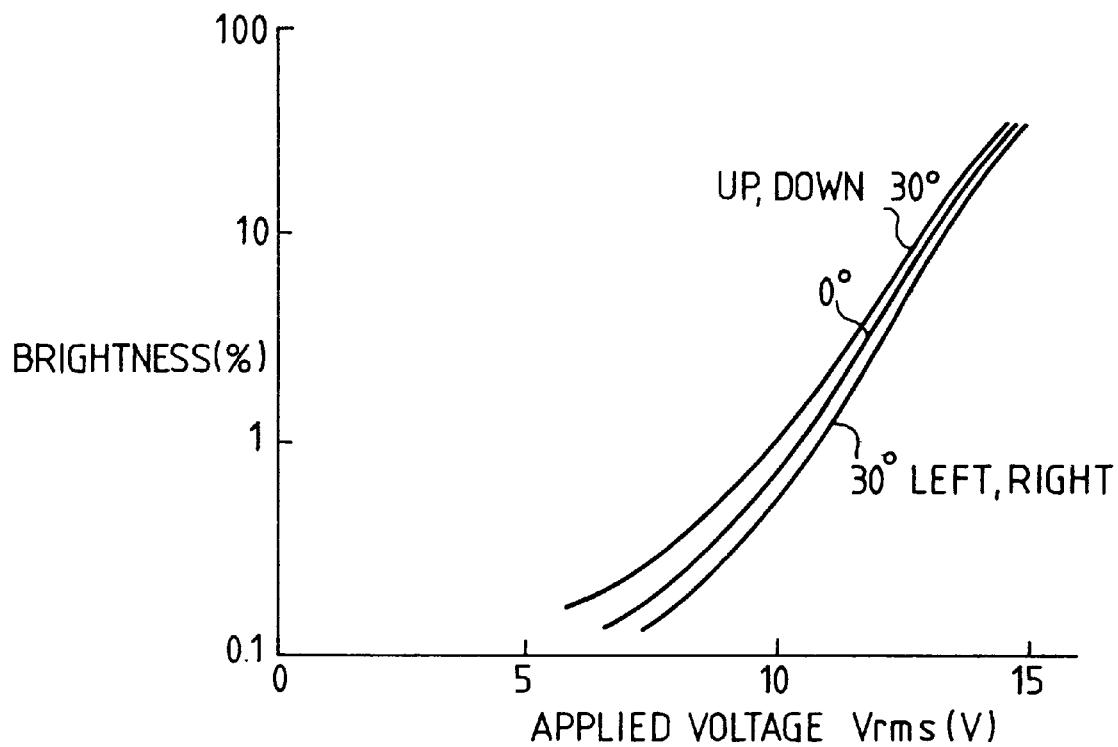
FIGS. 3(a) and 3(b) are graphs illustrating electro-optical characteristics (visual angle dependence), FIG. 3(a) corresponding to the present invention and FIG. 3(b) corresponding to a comparative example.

The electro-optical characteristics representing the relationship between the effective voltage applied to the pixels and the brightness in the present embodiment are shown in FIG. 3(a). The contrast ratios exceeded 150 when driven by voltages of e.g. 7 V. The difference between the characterizing when the visual angle was changed laterally or vertically were significantly smaller than in conventional system (to be discussed in comparative example 1), and the display characteristics were not changed significantly even if the visual angle was changed. The orientation character of the liquid crystal was preferable, and domains of orientation defects are not generated. The aperture factor maintained a sufficiently high value, e.g. 50% by simplifying the structure of the thin film transistor and the electrodes, and a bright display was achieved. The average transmission factor for the whole panel was 8.4%. It should be noted that the term "brightness" is defined as the brightness of transmission when the two polarizing plates are arranged in parallel.

The material of the liquid crystal 50 used in the first embodiment had a dielectric constant of 6.7 and a specific resistance of $5 \times 10^{10}$ Ωcm, and silicon nitride was used for the insulator of the capacitive device 11 having a dielectric constant of 6.7 and a specific resistance of $5 \times 10^{16}$ Ωcm. That means that the specific resistances of both the liquid crystal composition and the insulator of the capacitive device 11 were over $10^{10}$ Ωcm, and the product of the dielectric constant and the specific resistance of the silicon nitride, about $3 \times 10^4$ seconds, was larger than the product of the dielectric constant and the specific resistance of the liquid crystal composition, about 0.03 seconds. One vertical scanning period for the driving signal output from the scanning wiring driving LSI was about 16.6 ms with an ordinary liquid display device, and the value satisfied the condition that the scanning period should be far less than about $3 \times 10^4$ seconds. Therefore, it was possible to derive the time constant for accumulated charge leaking from the pixel electrode 1. This facilitates the suppression of voltage variations at the pixel electrode 1, and consequently a satisfactory display quality can be obtained. The value of $5 \times 10^{10}$ Ωcm for the specific resistance of the liquid crystal is lower than that for the liquid crystal used for the conventional vertical electric field thin film transistor liquid display device, which is about $10^{12}$ Ωcm. However, defects in the display quality were not generated.

COMPARISON EXAMPLE

The comparison example referred to above was based on a conventional twisted nematic (TN) type of liquid crystal display device. Since this example had a transparent electrode, the structure was complex and the manufacturing process was long compared with the first embodiment. The nematic liquid crystal used in the comparison example had a dielectric constant anisotropy $\Delta\in$ of positive 4.5 and a birefringence Δn of 0.072 (589 nm, 20° C.), the same as those of the first embodiment. The gap was set to 7.3 μm and the twist angle to 90 degrees. Thus, Δn·d is 0.526 μm.

Figure 3B:
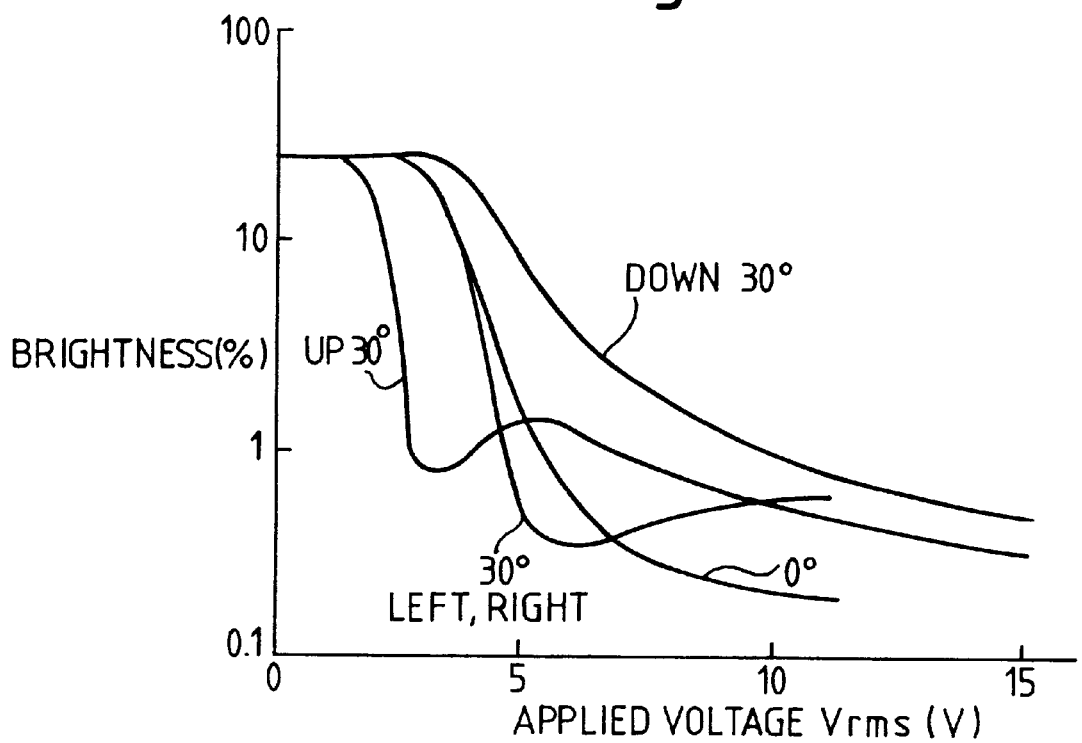

The electro-optical characteristic of this comparison example is shown in FIG. 3(b). The characteristic curves change greatly as the visual angle changes. Near a stepped portion adjacent to the thin-film transistor, an orientation failure domain occurs where the liquid crystal molecules are oriented in a direction different from that of the surrounding portion.

EMBODIMENT 2

Figure 4:
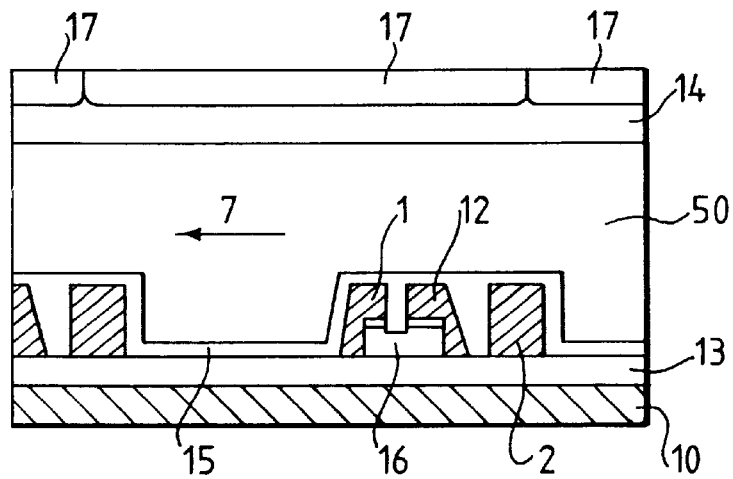
FIG. 4 shows an embodiment of the present invention in which the pixel electrode (source electrode), the common electrode, the scanning electrode, and the signal electrode (drain electrode) are all arranged on only one of the substrates of the device.

In the second embodiment, the scanning electrode which had been arranged on the substrate facing the substrate supporting the pixel in the first embodiment was formed on the same substrate as the pixel electrode. The rest of the structure of the second embodiment is generally the same as that of the first embodiment and corresponding parts are indicated by the same reference numerals. The cross section of the structure of the thin film transistor and the electrodes in the second embodiment are shown in FIG. 4. The pixel electrode 1, the signal electrode 12 and the scanning electrode 10 were all made from aluminum, and were formed simultaneously by being deposited and etched. There is no conductive material on the other substrate. Hence, in this structure, even if the conductive material is contaminated during the manufacturing process, there is no possibility of upper and lower electrodes touching each other, and so defects due to the upper and lower electrodes touching is eliminated. There is no special restriction on the material for the electrodes, but it should normally be a metal having a low electrical resistance, and so chromium, copper, etc. are thus suitable.

Generally, the precision of alignment of photomasks is significantly higher than that for two facing glass substrates. Therefore, variations in the alignment of the electrodes can be suppressed when all of the four electrodes are formed on only one of the substrates, as in the second embodiment, because alignment of the electrodes during manufacturing can be only applied to photomasks. Therefore, the present embodiment is suitable for forming more precise patterns in comparison with the case when the scanning electrode is formed on the other substrate.

A bright display having the same wide visual angle as the first embodiment was obtained.

EMBODIMENT 3

The structure of the third embodiment is generally the same as the first embodiment 1 except as will be described below. Components which correspond to components of the first embodiment are indicated by the same reference numerals.

Figure 5A:
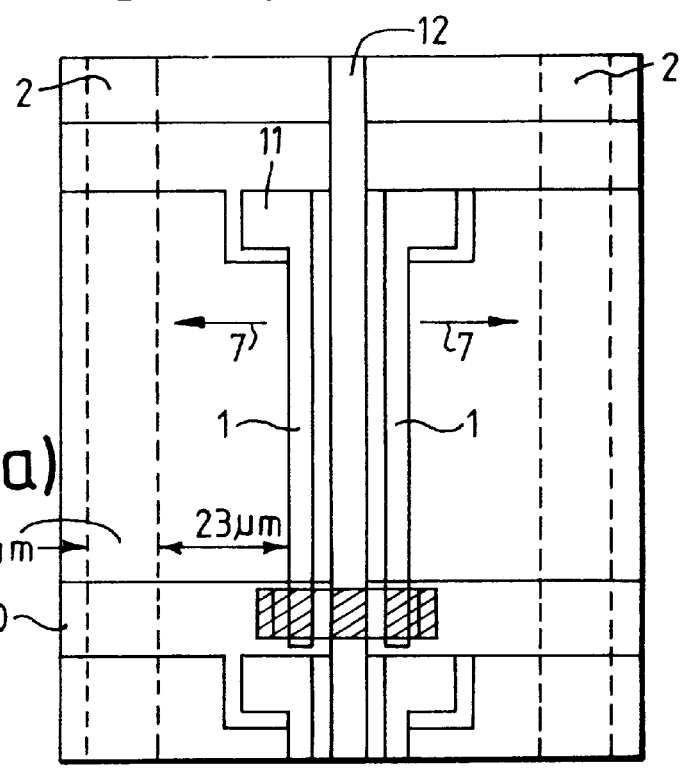
FIGS. 5(a) and 5(b) are plan and sectional views, respectively, of an embodiment of the present invention in which the pixel electrode (source electrode) and the signal electrode (drain electrode) are arranged at the center of the pixel to divide the pixel into two parts.
Figure 5B:
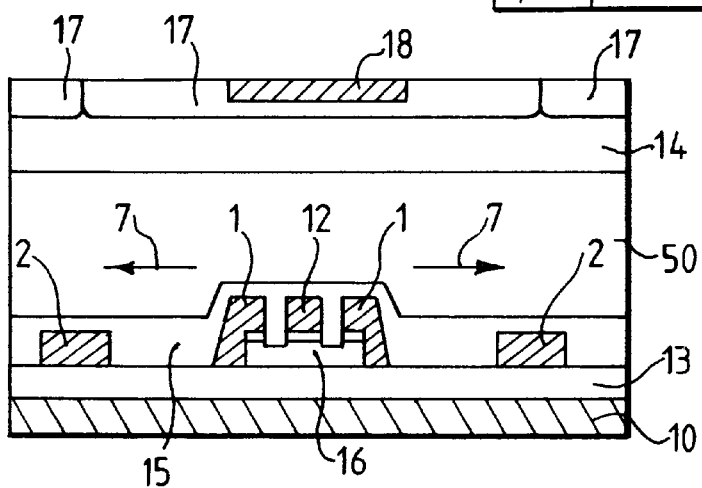

The structure of the thin film transistor and the various electrodes of the third embodiment are shown in FIGS. 5(a) and 5(b). The signal electrode 12 was arranged between a pair of pixel electrodes 1, and a pair of common electrodes 2 were arranged outside the above electrodes. A signal wave having information is applied to the signal electrode 12, and a scanning wave is applied to the scanning electrode 10 synchronously with the signal wave. A thin film transistor comprising amorphous silicon (a-Si) 16 and an insulating-protecting film 15 of silicon nitride (SiN) are arranged substantially centrally between a pair of common electrodes. The same information signals are transmitted from the signal electrode 12 to each of two pixel electrodes 1 through two thin film transistors, and the same voltage signals are applied to the liquid crystal, each of two common electrodes at both sides having the same potential. With this arrangement, the distance between the electrodes can be decreased by almost a half without making the structure of the thin film transistor and the electrodes complex. It thus becomes possible to apply a high electric field with the same voltage and to decrease the driving voltage. Hence, a high response can be achieved.

This embodiment permits the same brightness and wide visual angle to be achieved as in the first embodiment.

EMBODIMENT 4

The structure of the fourth embodiment is generally the same as the first embodiment except as will be described below. Components of the fourth embodiment which correspond to the first embodiment are indicated by the same reference numerals.

FIG. 15(a) is a partial plan view of an active matrix type liquid crystal display device forming the fourth embodiment. FIG. 15(b) is a cross sectional view taken on line XVB—XVB in FIG. 15(a), and FIG. 15(c) is a cross sectional view taken on line XVC—XVC FIG. 15(a). The capacitive device 11 which has a structure in which the gate insulating film made from silicon nitride 13 was located between the pixel electrode 1 and the scanning wiring 10 in the first embodiment 1 has been changed in this embodiment to a structure in which the liquid crystal composition layer 50 extends between parts of the pixel electrode 1 and the common electrode 2 which face each other, as shown in FIG. 15(c).

The fourth embodiment enables an electrostatic capacitance of the capacitive device 11 to be connected in parallel to an electrostatic capacitance between the pixel electrode 1 and the common electrode 2. Hence, any voltage variation at the signal wiring 10 does not affect the pixel electrode 1. Therefore, the voltage variation at the pixel electrode 1 could be reduced, reducing variations in the display.

There is no deterioration in display quality with the active matrix type liquid crystal display device of this fourth the present embodiment, and so the same advantages as the first embodiment can be obtained

EMBODIMENT 5

The structure of each of the fifth to tenth embodiments are generally the same as the first embodiment, except as will be described below. Corresponding parts are indicated by the same reference numerals.

Figure 16:
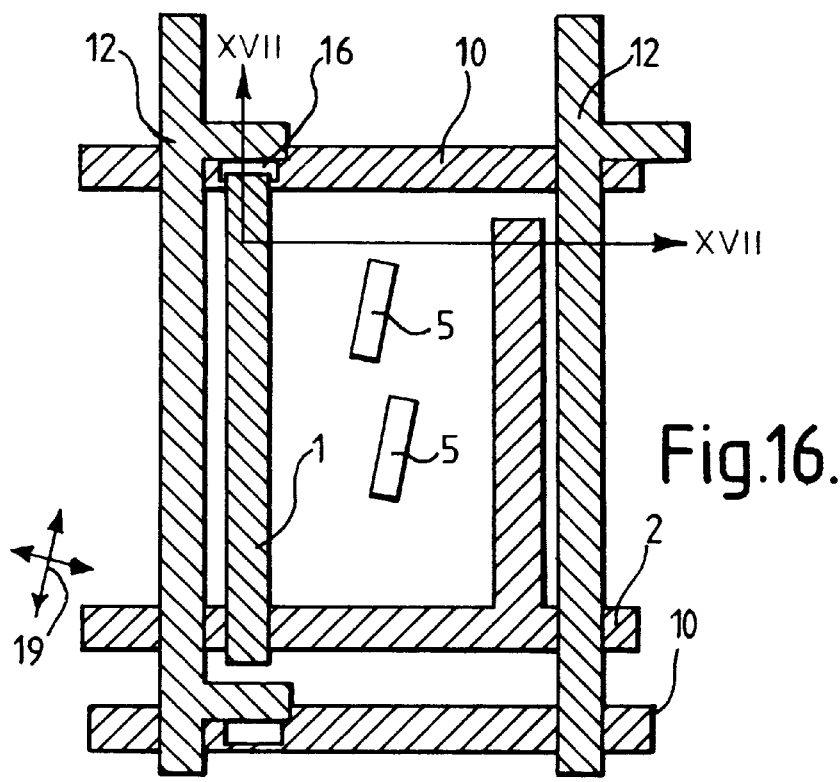
FIG. 16 is a schematic plan view of a pixel when no electric field is applied, for a fifth embodiment of the present invention in which the pixel electrode and the common electrode are arranged at different layers separated by an insulating layer.
Figure 17:
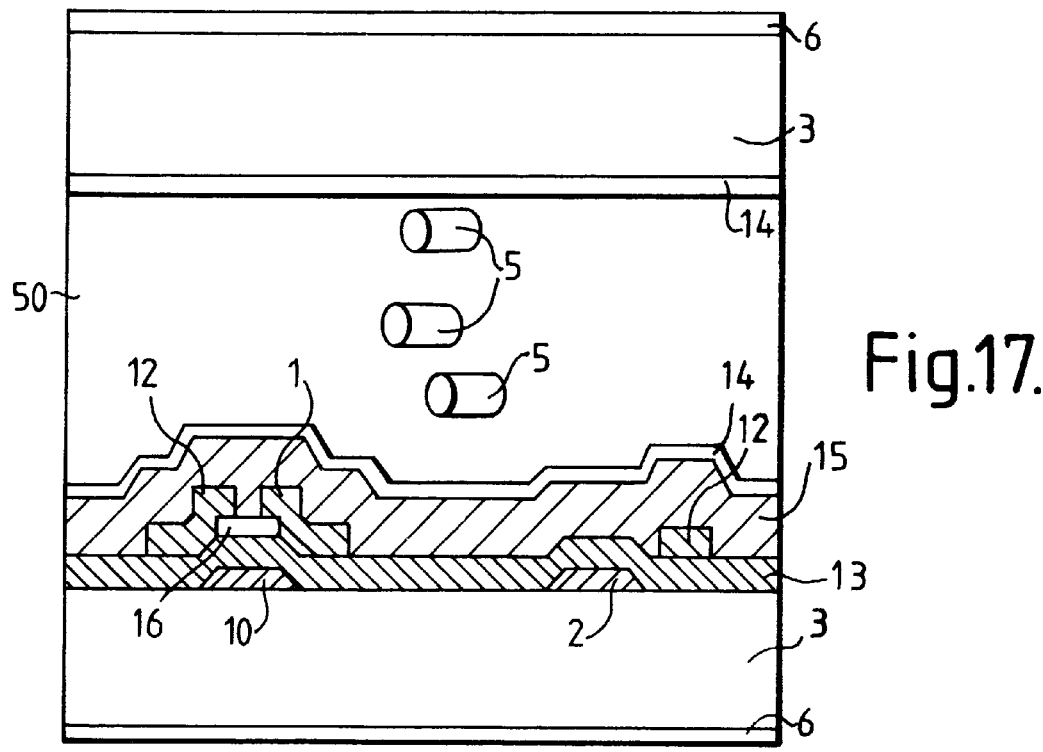
FIG. 17 is a schematic cross sectional view of a pixel when no electric field is applied in the fifth embodiment in which the pixel electrode and the common electrode are arranged at different layers separated by an insulating layer.

FIGS. 16 and 17 respectively show a plan view and a cross sectional view of a unit pixel of the fifth embodiment, in which the pixel electrode 1 and the common electrode 2 are located on the same side of the liquid crystal material and are separated by an insulating layer. A scanning electrode 10 and a common electrode 2 of chromium are formed on a glass substrate, and a gate insulating film 13 of silicon nitride (SiN) is formed so as to cover the above electrodes. An amorphous film (a-Si) 16 is formed on a part of the scanning electrode 10 with the gate insulating film 13 therebetween as an active layer of the transistor A signal electrode 12 and a pixel electrode 1 of molybdenum are formed to overlap on a part of the pattern of the a-Si film 16, and a protection and insulating film 15 of SiN film is formed so as to cover the resulting structure. When the thin film transistor is operated by applying a voltage to the scanning electrode 13 of the thin film transistor, a voltage is applied to the pixel electrode 1. When an electric field is induced between the pixel electrode 1 and the common electrode 2 the liquid crystal molecules change their orientation in the direction of the electric field and the light transmission changes.

In the fifth embodiment, the common electrode 2 is formed on the same layer as the scanning electrode 10, and the pixel electrode 1 and the signal electrode 12 are separated from the common electrode 2 by the gate insulating film 13. The device of the fifth embodiment thus differs from that disclosed in JP-B-63-21907 (1988), in that conventional comb shaped electrodes are not used, and the pixel electrode 1 and the common electrode 2 overlap, with the gate insulating film 20 being disposed therebetween. By separating the pixel electrode 1 and the signal electrode 12 from the common electrode 2 by insulation, the design freedom for the plan pattern of the pixel electrodes 1 and the common electrodes 2 is increased, and it becomes possible to increase the pixel aperture factor.

The overlapping parts of the pixel electrode 1 and the common electrode 2 operate as an additional capacitance which is connected in parallel to the liquid crystal capacitance, and accordingly, it becomes possible to increase the holding ability of the liquid crystal charged voltage. This advantage cannot be achieved by a conventional comb shaped electrode, and the advantages are achieved only by separating the pixel electrode 1 and the signal electrode 12 from the common electrode in an insulating manner. As FIG. 16 reveals, it is not necessary to form a capacitive device by sacrificing a part of the display region, as in the case when the pixel electrode and the common electrode are formed on the same substrate, and all that is needed is to provide an overlap in a part of the wiring for leading out the common electrode outside the display region.

As described above, since the design freedom for the plan pattern increases by forming the pixel electrode 1 and the signal electrode 12 in a separate layer from the layer having the common electrode 2, various types and shapes of electrodes can be adopted notwithstanding the present embodiment.

EMBODIMENT 6

Figure 18:
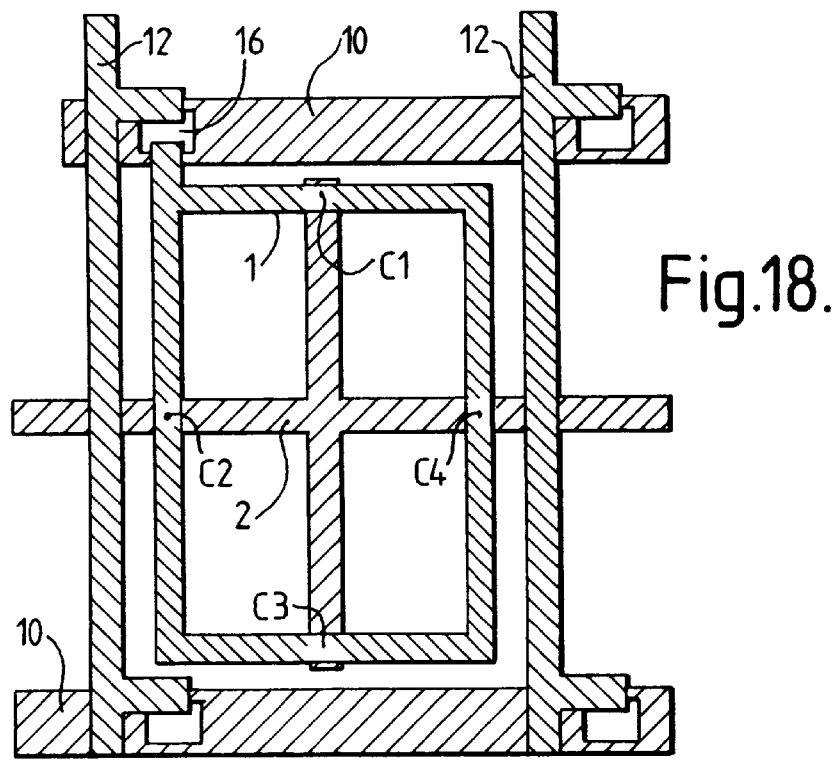
FIG. 18 is a schematic plan view of a pixel when no electric field is applied in a sixth embodiment of the present invention in which the pixel electrode and the common electrode are arranged at different layers separated by an insulating layer, the pixel electrode being a closed loop and the common electrode being cruciform.

FIG. 18 shows a plan view of a unit pixel forming a sixth embodiment of the present invention in which the pixel electrode 1 and the common electrode 2 are located in different layers separated by an insulating layer. The cross sectional structure of the sixth embodiment is the same as that of the fifth embodiment (FIG. 17).

In the sixth embodiment, the common electrode 2 is cruciform and the pixel electrode 1 forms a closed loop. The pixel electrode 1 and the common electrode 2 overlap at parts C1, C2, C3 and C4 in FIG. 18, so as to form additional capacitances. In the sixth embodiment, the distance between the common electrode 2 and the scanning electrode 10 can be made wide, and thus failures due to short circuits between the common electrode 2 and the scanning electrode 10 can be prevented. Since the pixel electrode 1 is in the form of a closed loop, normal operation can be maintained as power is supplied to all parts of the pixel electrode even if a breaking occurs at an arbitrary portion of the pixel electrode, unless a break occurs at two or more parts. That means that the structure of the sixth embodiment has a redundancy for breaking of the pixel electrode 1 and the production yield can therefore be increased. On account of the redundancy, it becomes possible to reduce the wiring gap of the closed loop electrode 1, to make that electrode 1 close to the wiring part of the scanning electrode 10 when they are arranged in different layers, thereby increasing the aperture factor.

EMBODIMENT 7

Figure 19:
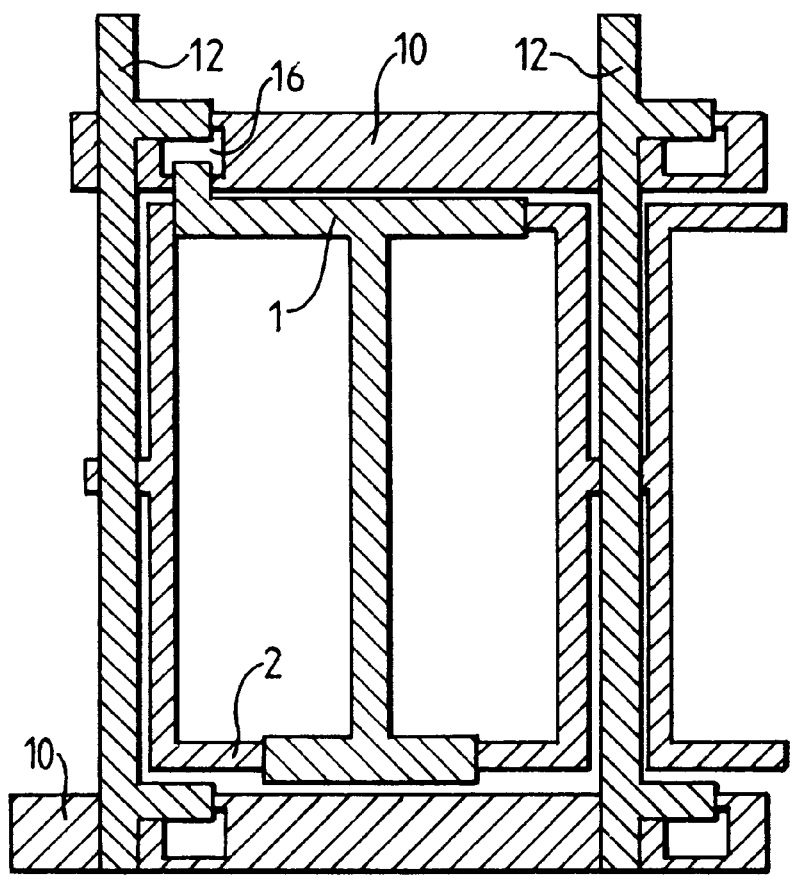
FIG. 19 is a schematic plan view of a pixel when no electric field is applied in a seventh embodiment of the present invention in which the pixel electrode and the common electrode are arranged at different layers separated by an insulating layer, the pixel electrode having the shape of the letter I and the common electrode being a closed loop.

FIG. 19 shows a plan view of a unit pixel forming a seventh embodiment of the present invention in which the pixel electrode 1 and the common electrode 2 are located in different layers separated by an insulating layer. The cross sectional structure of the seventh embodiment is the same as that of the fifth embodiment (FIG. 17).

In the sixth embodiment, the pixel electrode 1 is in the shape of a letter I, and the common electrode 2 is in the form of a closed loop. In the seventh embodiment, the aperture factor can be improved as in the sixth embodiment, and the additional capacitance can be increased because the extent of the overlapping of the pixel electrode 1 and the common electrode 2 can be increased.

EMBODIMENT 8

Figure 20:
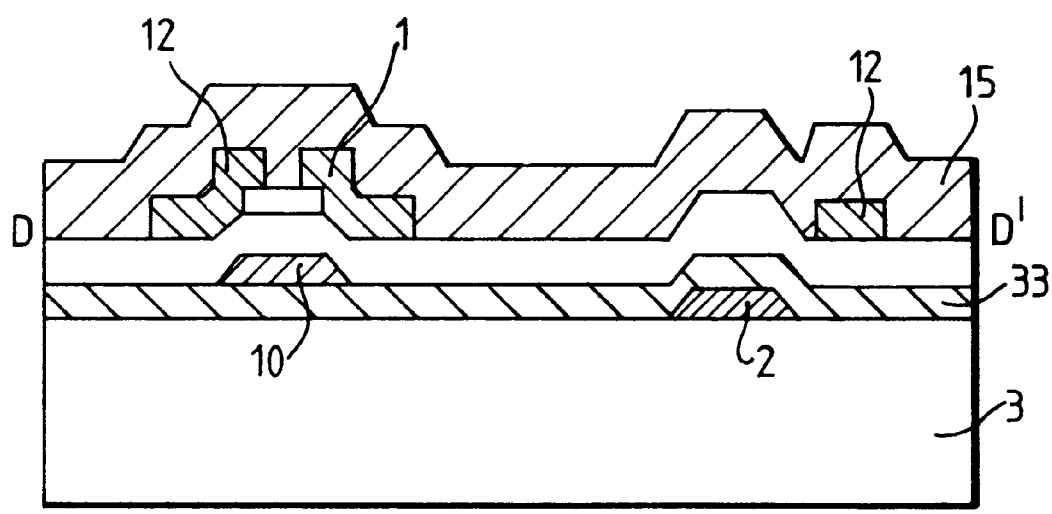
FIG. 20 is a schematic cross sectional view of part of a pixel when no electric field is applied in an eighth embodiment of the present invention in which the pixel electrode and the common electrode are arranged at different layers separated by an insulating layer, and there is an insulating layer between the scanning electrode and the common electrode.

FIG. 20 shows a plan view of a unit pixel forming an eighth embodiment of the present invention in which the pixel electrode 1 and the common electrode 2 are located in different layers separated by an insulating layer.

In the eighth embodiment, the common electrode 2 is mounted on the substrate 3 and is separated from the scanning electrode 10 by a bedding layer insulating film 33. Thus, the common electrode 2 is located on the substrate 3 and is in a different layer separate from the layers, forming the scanning electrode 10, the pixel electrode 1 and the signal electrode 12. Therefore, in accordance with the eighth embodiment, it becomes possible for the common electrode 2 to extend not only parallel to the Scanning electrode 10, but also perpendicular to the scanning electrode 10 to form a network structure. Therefore, the resistance of the common electrode 2 can be decreased, and accordingly, reductions of the wave distortion in the common voltage and prevention of smear generation can be achieved.

EMBODIMENT 9

Figure 21:
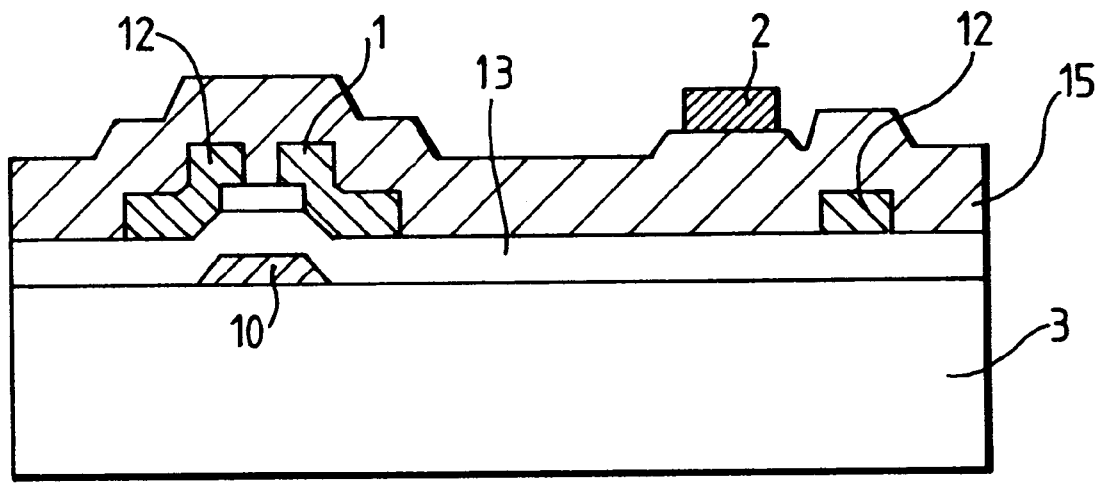
FIG. 21 is a schematic cross sectional view of part of a pixel when no electric field is applied in a ninth embodiment of the present invention in which the pixel electrode and the common electrode are arranged at different layers separated by an insulating layer, and the common electrode is formed on the protection insulating film.

FIG. 21 shows a plan view of unit pixel forming a ninth embodiment of the present invention in which the pixel electrode 1 and the common electrode 2 are located in different layers separated by an insulating layer.

In the ninth embodiment, the common electrode 2 is mounted on a protecting-insulating film 15. In accordance with the present embodiment, the common electrode 2 is located in a different layer separate from the layers forming all the scanning electrode 10, the pixel electrode 1, and the signal electrode 12, as in the eighth embodiment. Therefore, it is possible for the common electrode 2 to extend not only parallel to the scanning electrode 10 but also perpendicular direction to the scanning electrode 10 to form a network structure. Accordingly, the resistance of the common electrode 2 can be reduced, wave distortion in the common voltage can be decreased, and smear generation can be prevented.

EMBODIMENT 10

Figure 22:
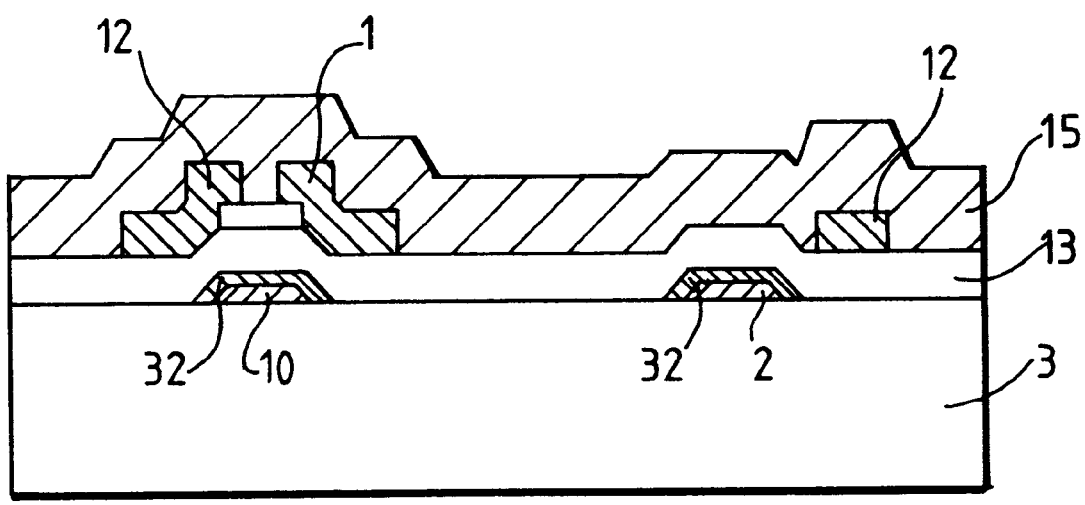
FIG. 22 is a schematic cross sectional view of part of a pixel when no electric field is applied in a tenth embodiment of the present invention in which the pixel electrode and the common electrode are arranged at different layers separated by an insulating layer, and both the scanning electrode and the common electrode are made from aluminum coated with self-oxidized film.

FIG. 22 shows a plan view of a unit pixel forming a tenth embodiment of the present invention in which the pixel electrode 1 and the common electrode 2 are located in different layers separated by an insulating layer.

In the tenth embodiment, the scanning electrode 10 and the common electrode 2 are made from aluminum (Al), and surfaces of those electrodes 2, 10 are covered by alumina ($Al_2O_3$) 32, which is a self-oxidized film of aluminum. The adoption of such a structure having double insulating layers decreases the possibility of failure of the insulation between the common electrode 2 the signal electrode 12, and the pixel electrode 1, and accordingly, pixel failure can be decreased.

EMBODIMENT 11

The structure of the eleventh embodiment is generally the same as the first embodiment except as will be described below. Corresponding parts are indicated by the same reference numerals.

In the eleventh embodiment, a flattening film 14 (FIG. 2(b)) made from a transparent polymer is laminated on the color filters 27 as an organic insulating layer, and the surface of the film is subjected to a direct rubbing treatment without forming other films, such as an orientation control film on the flattening film 14. Epoxy resin is used for the material of the transparent film. The epoxy resin has two functions, namely that of flattening and orientation control of the liquid crystal molecules. The liquid crystal composition layer is in direct contact with the epoxy resin, and the inclination angle of the interface is 0.5 degrees.

This structure eliminates the need to provide an orientation film, and makes the manufacturing easier and shorter.

Generally, in the conventional twisted nematic (TN) type, a variety of characteristics are required for the orientation film, and it was necessary to satisfy all of those requirements. Therefore, the material for the orientation film was limited to a small variety of materials, such as polyimide etc. The inclination angle is the most important characteristic. However, as explained previously, the present invention does not require a large inclination angle, and thus the range of material selection is significantly increased.

Measurement of electro-optical characteristics of the eleventh embodiment revealed that, as in the first embodiment, the change in the characteristic curves was extremely small when the visual angle was changed laterally and vertically, and the display characteristics hardly changed. Although the inclination angle was as small as 0.5 degrees, the liquid crystal orientation was satisfactory, and no orientation failure domain was generated.

EMBODIMENT 12

In the twelfth embodiment, the transparent resin forming the flattening film 14 in the eleventh embodiment is changed from epoxy resin to polyimide resin. The surface of the polyimide resin is directly rubbed so that it has both the function of flattening and the function of orientation control of the liquid crystal molecules. The inclination angle on the interface is 2 degrees. In comparison with other embodiments, the display characteristics are hardly changed. The liquid crystal orientation is satisfactory and no orientation failure domain is generated.

EMBODIMENT 13

The structure of the thirteenth embodiment is the same as the first embodiment 1 except as will be described below. Corresponding parts are indicated by the same numerals.

The protection film 15 (FIG. 2(b)) of silicon nitride for protecting the thin film transistor in the first embodiment is replaced with an organic insulating layer made from epoxy resin. The surface of the epoxy resin is directly treated by rubbing so that it functions both as a flattening film and an orientation control film for the liquid crystal molecules. The inclination angle is 0.5 degrees.

Measurement of the electro-optical characteristics of the thirteenth embodiment revealed that the display characteristics were hardly changed in comparison with the first embodiment 1. Although the inclination angle was as small as 0.5 degrees, in the eleventh embodiment, the liquid crystal orientation was satisfactory, and no orientation failure domain was generated.

EMBODIMENT 14

In the fourteenth embodiment, the epoxy resin used as the protection film in the thirteenth embodiment is replaced with an organic insulating layer made from polyimide resin.

Measurement of the electro-optical characteristics in the fourteenth embodiment revealed that the display characteristics were hardly changed in comparison with the first embodiment 1. The inclination angle was slightly increased to 2.0 degrees in comparison with the thirteenth embodiment. The liquid crystal orientation was satisfactory, and no orientation failure domain was generated.

EMBODIMENTS 15–19

The structure of the fifteenth to nineteenth embodiments are the same as the fourteenth embodiment except as will be described below.

In the fifteenth embodiment, the directions of the long axes of the liquid crystal molecules on the upper and the lower interfaces (the rubbing direction) are almost in parallel to each other and are set at 89.5 degrees ($\phi_{LC1}=\phi_{LC2}=89.50$) with respect to the applied electric field. The polarized light transmission axis of one of the polarizing plates is set almost in parallel to the rubbing direction ($\phi_{P1}=89.50$) and the polarized light transmission axis of the other polarizing plate is set perpendicular to the first axis ($\phi_{P2}=-0.50°$).

Similarly, in the sixteenth embodiment, $\phi_{LC1}=\phi_{LC2}=\phi_{P1}=88°$, and $\phi_{P2}=-2.0°$.

Similarly, in the seventeenth embodiment, $\phi_{LC1}=\phi_{LC2}=\phi_{P1}=75°$, and $\phi_{P2}=-25°$.

Similarly, in the eighteenth embodiment, $\phi_{LC1}=\phi_{LC2}=\phi_{P1}=45°$, and $\phi_{P2}=-45°$.

Similarly, in the nineteenth embodiment, $\phi_{LC1}=\phi_{LC2}=\phi_{P1}=30°$, and $\phi_{P2}=-60°$.

The results of the measurement of the electro-optical characteristics for these embodiments are shown in a single diagram of FIG. 7. In these embodiments, the brightness is expressed by a normalized value such that the maximum brightness in a range of applied voltage from zero volt to 10 volts (effective value $V_{rms}$) is 100% and the minimum brightness is 0%. There is a tendency for the characteristics curves at the threshold to become steep as the angle $\phi_{LC}$ is increased. In order to provide a large voltage margin for half-tone, the angle $\phi_{LC}$ must be reduced. However, there is a tendency that when the angle $\phi_{LC}$ is smaller than 45 degrees, the brightness decreased. The optimum value of the angle $\phi_{LC}$ depends on the number of the half-tone levels to be displayed, the requirement for brightness, driving voltage, and whether or not the common electrode has a voltage applied thereto. A designer can control the threshold characteristics in a wide range by suitably selecting the angle $\phi_{LC}$. When considering brightness, the angle $\phi_{LC}$ is preferably at least 45 degrees. An angle between 60 degrees and 89.5 degrees is more preferable.

Measurement of the visual angle characteristics revealed that, in each case, the characteristics curve changed very slightly when the visual angle was changed laterally and vertically, and the display characteristics were hardly changed, as in the embodiment 1.

The liquid crystal orientation was satisfactory, and no orientation failure domain was generated.

EMBODIMENTS 20–23

The greatest difference between the foregoing embodiments previously described and the twentieth to twenty-third embodiments is that the dielectric constant anisotropy of the liquid crystal composition layer is set to be negative and the rubbing direction is changed accordingly. A nematic liquid crystal (e.g. that known as ZLI-2806 of Merck Co.) with a $\Delta\in$ of −4.8, and a $\Delta n$ of 0.0437 (589 nm, 20 C°) is used. In the twentieth to twenty-third embodiments, the directions of the long axes of liquid crystal molecules on the upper and the lower interfaces (the rubbing directions, ($\phi_{LC1}$, $\phi_{LC2}$) are approximately parallel ($\phi_{LC1}=\phi_{LC2}$) to each other and set at an angle, $\phi_{LC1}$, exceeding zero degree and less than 45 degrees with respect to the applied electric field. The polarized light transmission axis of one of the polarizing plates is set approximately parallel to the rubbing direction ($\phi_{P1}$) and the polarized light transmission axis of the other polarizing plate is set perpendicular to the first axis ($\phi_{P2}$).

Thus, in the twentieth embodiment, $\phi_{LC1}=\phi_{LC2}=\phi_{P1}=15°$, and $\phi_{P2}=-88.50$.

In the twenty-first embodiment, $\phi_{LC1}=\phi_{LC2}=\phi_{P1}=15°$, and $\phi_{P2}=-75°$ In the twenty-second embodiment, $\phi_{LC1}=\phi_{LC2}=\phi_{P1}=30°$, and $\phi_{P2}=-60°$ In the twenty-third embodiment, $\phi_{LC1}=\phi_{LC2}=\phi_{P1}=45°$, and $\phi_{P2}=-45°$ The gap d is set to be 6.3 $\mu$m with the liquid crystal under sealed conditions and the value of $\Delta n \cdot d$ is set to be 0.275 $\mu$m. Other conditions, such as the structure of the thin film transistor and the electrodes, are the same as the third embodiment.

Figure 11:
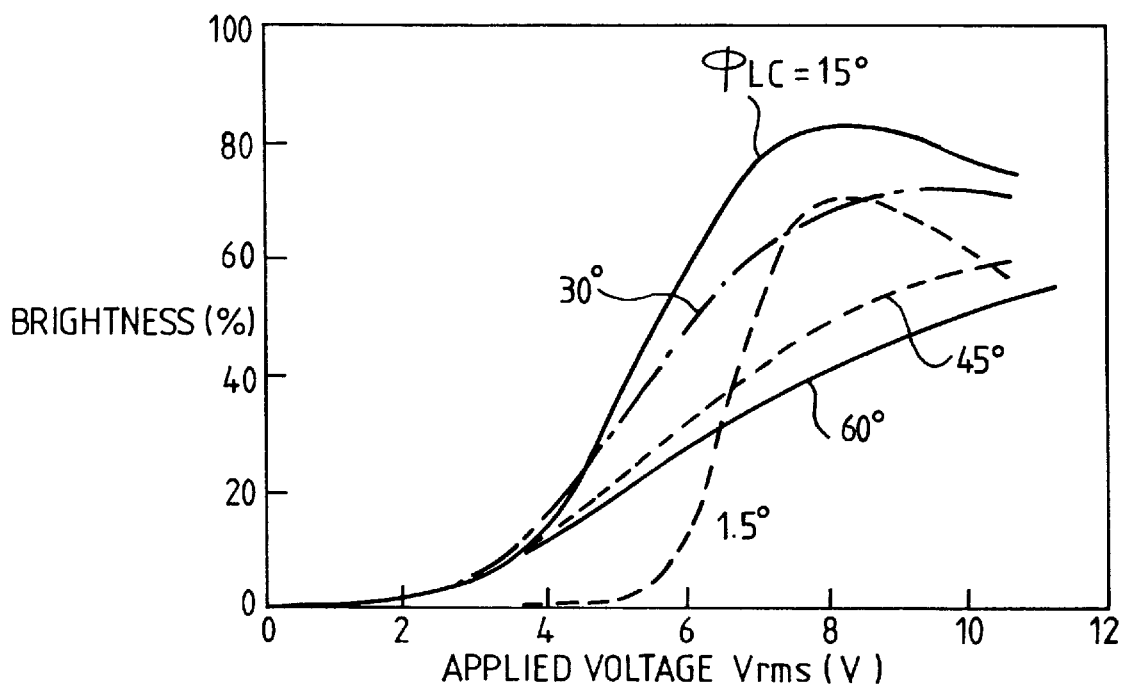
FIG. 11 is a graph illustrating the electro-optical characteristics of various embodiments with different orientation directions of the long axis of the liquid crystal molecules at the interface when the dielectric constant anisotropy is negative.

The results of the measurement of the electro-optical characteristics in these embodiments are shown in the single diagram of FIG. 11. Unlike the case when the dielectric constant anisotropy is positive, there is a tendency for the characteristic curves of the threshold to become steep as the angle $\phi_{LC}$ is decreased. In order to provide a large voltage margin for half-tone, the angle $\phi_{LC}$ must be increased. However, there is a tendency that when the angle $\phi_{LC}$ is larger than 45 degrees, the brightness decreased. As in the case when the dielectric constant anisotropy is positive, the optimum value of the angle $\phi_{LC}$ depends on the number of the half-tone levels to be displayed, the requirement for brightness, driving voltage, and whether or not the common electrode has a voltage applied. A designer can control the threshold characteristics in a wide range by suitably selecting the angle $\phi_{LC}$. When considering the brightness, the angle $\phi_{LC}$ is almost 45 degrees.

Measurement of the visual angle characteristics revealed that, in each case, the characteristics curve changed very slightly when the visual angle was changed laterally and vertically, and the display characteristics were hardly changed, as in the first embodiment. No reversions of levels in the half-tone display (8 steps) were observed in a range ±50 degrees both laterally and vertically. The liquid crystal orientation was satisfactory, and no orientation failure domain was generated.

EMBODIMENTS 24 to 26

In these embodiments, the directions of the long axes of liquid crystal molecules and the arrangement of the polarizing plates are set to be the same as the twenty-first embodiment, which produced the best characteristics among the embodiments 20 to 23 $\phi_{LC1}=\phi_{LC2}=\phi_{P1}=15°$, and ($\phi_{P2}=-75°$). Only the product, d·Δn, of the thickness of the liquid crystal composition layer d and refractive index anisotropy Δn was changed. In the twenty-fourth, twenty-fifth and twenty-sixth embodiments, the thickness d of the liquid crystal composition layer was set to be 4.0, 4.9, and 7.2 µm, respectively. Thus, the product, d·Δn, is 0.1748, 0.2141, and 0.3146 µm, respectively. In these embodiments, the refractive index anisotropy Δn is a constant and only the thickness of the liquid crystal composition layer d is changed. However, as well as the other type of the liquid crystal display (such as the 90 degree twisted nematic type), the same result for the optimum brightness can be obtained even if the refractive index anisotropy Δn is changed. Moreover, the same result can be obtained even if the liquid crystal composition layer has a positive dielectric constant anisotropy.

Figure 12A:
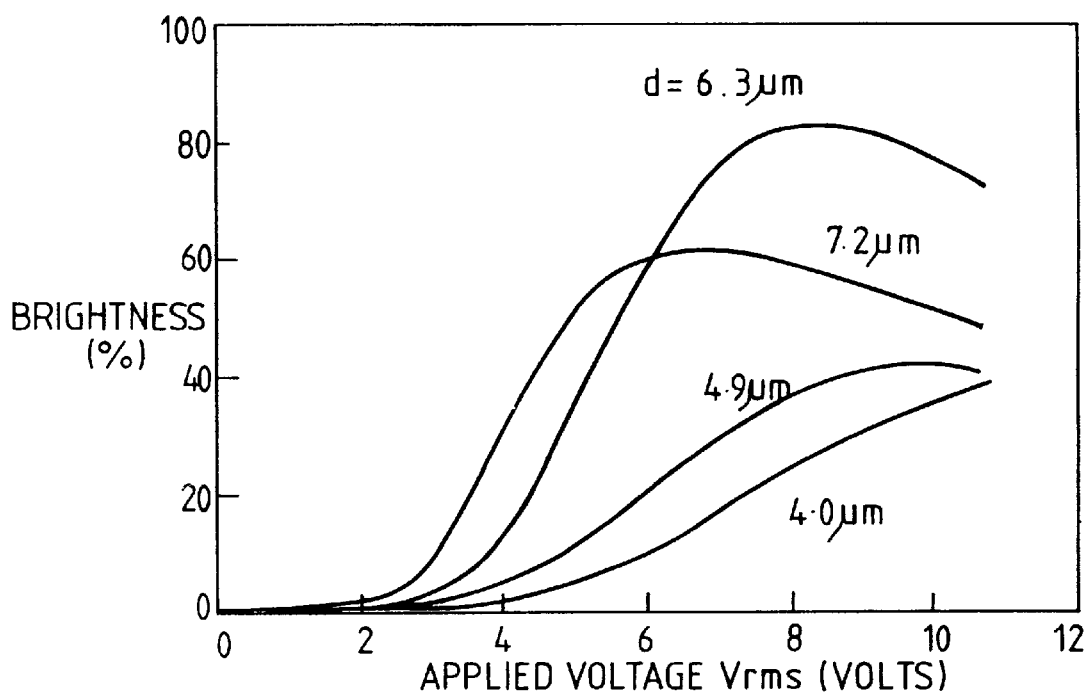
FIGS. 12(a) and 12(b) are graphs illustrating the electro-optical characteristics of various embodiments with different thicknesses d of the liquid crystal layer when the dielectric constant anisotropy is negative.
Figure 12B:
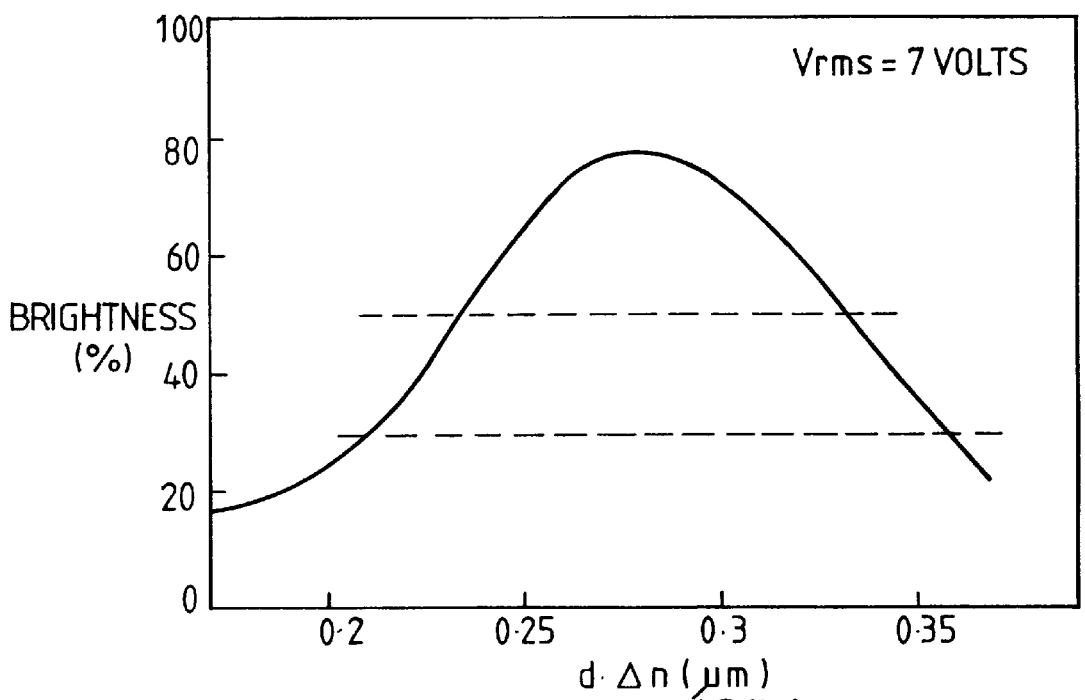

The results of the measurement in these embodiments are shown in FIG. 12. The abscissa in FIG. 12(a) indicates applied voltages, and the abscissa in FIG. 12(b) indicates d·Δn with the applied voltage being a constant 7 Volts. As FIG. 12(b) reveals, the brightness depends strongly on d·Δn and an optimum value exists. In order to maintain a brightness of at least 30%, which is preferable for practical use, the value of d·Δn should be between 0.21 and 0.36 µm; and further, if a brightness exceeding 50% is desired, the value of d·Δn between 0.23 and 0.33 µm must be selected. In consideration of the sealing time for the liquid crystal, thickness control of the liquid crystal composition layer etc, and mass-production considerations, the value for d must be at least 5.0 µm, and a Δn of almost 0.08 is preferable.

EMBODIMENTS 27 to 29

As the results of the twenty-fourth to twenty-sixth embodiments reveal, the optimum value of d·Δn is between 0.21 and 0.36 µm, preferably between 0.23 and 0.33 µm. Since the thickness of the liquid crystal composition layer which is preferable for mass-production is at least 5.0 µm, the value of the refractive index anisotropy Δn must be almost 0.072, preferably almost 0.066. However, the kinds of liquid crystal compounds having such an extremely low value for Δn are very limited, and it is very difficult for them to be compatible with other characteristics required for practical use.

Therefore, a new method was considered in which the values of d and Δn of the liquid crystal composition layer are set rather higher than the optimum values, and an optically anisotropic medium having a lower value for phase difference Rf than the value for d·Δn of the liquid crystal composition layer is provided. This compensates for the departure from the optimum value by the phase difference with the liquid crystal composition layer. As a result, the effective phase difference which is generated by the combination of the liquid crystal composition layer and the optically anisotropic medium is in the optimum range between 0.21 and 0.36 µm.

In the twenty-seventh to twenty-ninth embodiments, the structure is the same as the third embodiment except as will be described. The thickness of the liquid crystal composition layers is set to be 5.0, 5.2, and 5.5 µm, respectively. A nematic liquid crystal composition having the refractive index anisotropy Δn of 0.072 (589 nm, 20 C°) is used, so that the value for d·Δn is 0.360, 0.3744, and 0.396 µm, respectively. As the brightness and color tone are higher than the preferable range between 0.21 to 0.36 µm, the liquid crystal cell is colored orange. An optically anisotropic medium 28 (see FIG. 9) of an uniaxially stretched film made from polyvinyl alcohol is laminated over the liquid crystal cell so as to compensate for the birefringent phase difference of the liquid crystal at a low voltage driving condition (in these embodiments, zero volts). Therefore, $\phi_R$ is selected to be 85 degrees, being the same as $\phi_{LC1}$ ($=\phi_{LC2}$) The phase difference Rf is 0.07, 0.08, and 0.10 µm, respectively, and the value for (d·Δn−Rf) is selected to be 0.29, 0.3044, and 0.296 µm, respectively, so as to be in the preferable range from 0.21 to 0.36 µm for the brightness and the color tone.

As a result, a bright display having a brightness exceeding 50% without coloring could be obtain.

EMBODIMENT 30

In the thirtieth embodiment, the liquid crystal composition layer in the twenty-seventh embodiment is replaced with a nematic liquid crystal composition (e.g. ZLI-4518 of Merck Co.) for which the dielectric constant anisotropy Δ∈ is negative with a value of −2.5, and its Δn is 0.0712 (589 nm, 20 C°). The rest of the device is the same as the twenty-first embodiment except as will be described below. The thickness of the liquid crystal composition layers is set to be 5.5 µm. Thus, the value for d·Δn is 0.3916 µm. An optically anisotropic medium of an uniaxially stretched film made from polyvinyl alcohol having a phase difference Rf of 0.11 µm is laminated over the liquid crystal cell so that the value for (d·Δn−Rf) is 0.2816 µm within the preferable range from 0.21 to 0.36 µm for the brightness and the color tone.

As a result, a bright display having a brightness exceeding 50% without coloring could be obtained.

EMBODIMENT 31

The structure of the thirty-first embodiment is generally the same as the fifteenth embodiment except as will be described below.

In the thirty-first embodiment, Δn of the liquid crystal composition layer is 0.072, and the gap is 7.0 µm. Therefore, d·Δn is 0.504 µm, $\phi_{LC1}$ is 89.5 degrees, the orientation direction of the liquid crystal molecules at the upper interface and the lower interface are set so as to cross over perpendicularly to each other, and the angle, $|\phi_{LC1}-\phi_{LC2}|$, is 90 degrees. The polarizing plates are arranged perpendicularly to each other ($|\phi_{P2}-\phi_{P1}|=90°$), and the relationship with the orientation direction of the liquid crystal molecules is selected so that $\phi_{LC1}=\phi_{P1}$, so thereby providing an optical rotatory mode. As a result, a normally open type of liquid crystal display device is obtained.

Measurement of the electro-optical characteristics in the thirty-first embodiment revealed the result that the brightness exceeded 50%, there was an extremely small difference in the characteristics curve when the visual angle was changed laterally and vertically, and scarcely changed display characteristics could be obtained. The orientation of the liquid crystal was satisfactory and no orientation failure domain was generated.

EMBODIMENTS 32 and 33

The structures of the thirty-second and thirty-third embodiments are generally the same as the first embodiment except as will be described below.

In these embodiment, the polarizing plates were so arranged that the dark state was obtained when an electric field of low level, not zero, was applied. The value of $|\phi_{LC1}-\phi_{P1}|$ was set at 5 degrees in the thirty-second embodiment, and 15 degrees in the thirty-third embodiment, respectively, and the value of $|\phi_{P2}-\phi_{P1}|$ was set at 90 degrees for both thirty-second and thirty-third the embodiments.

A satisfactory display characteristic, for both brightness and visual angle was obtained, as in the other embodiments. Also, the liquid crystal orientation was satisfactory, and no orientation failure domain was generated.

EMBODIMENTS 34 and 35

The structures of the thirty-fourth and thirty-fifth embodiments are generally the same as the twenty-first embodiment except as will be described below.

In the twenty-fourth and twenty-fifth embodiments, the polarizing plates are arranged so that the dark state is obtained when an electric field of low level, not zero, is applied. The value $|100_{P1}-100_{LC1}|$ is set at 5 degrees in the thirty-fourth embodiment and 7 degrees in the thirty-fifth embodiment, respectively, and the value of $|100_{P2}-100_{P1}|$ is set as 90 degrees for both embodiments. The thickness d of the liquid crystal composition layer is 3 μm. Therefore, d·Δn is 0.275 μm.

Figure 13A:
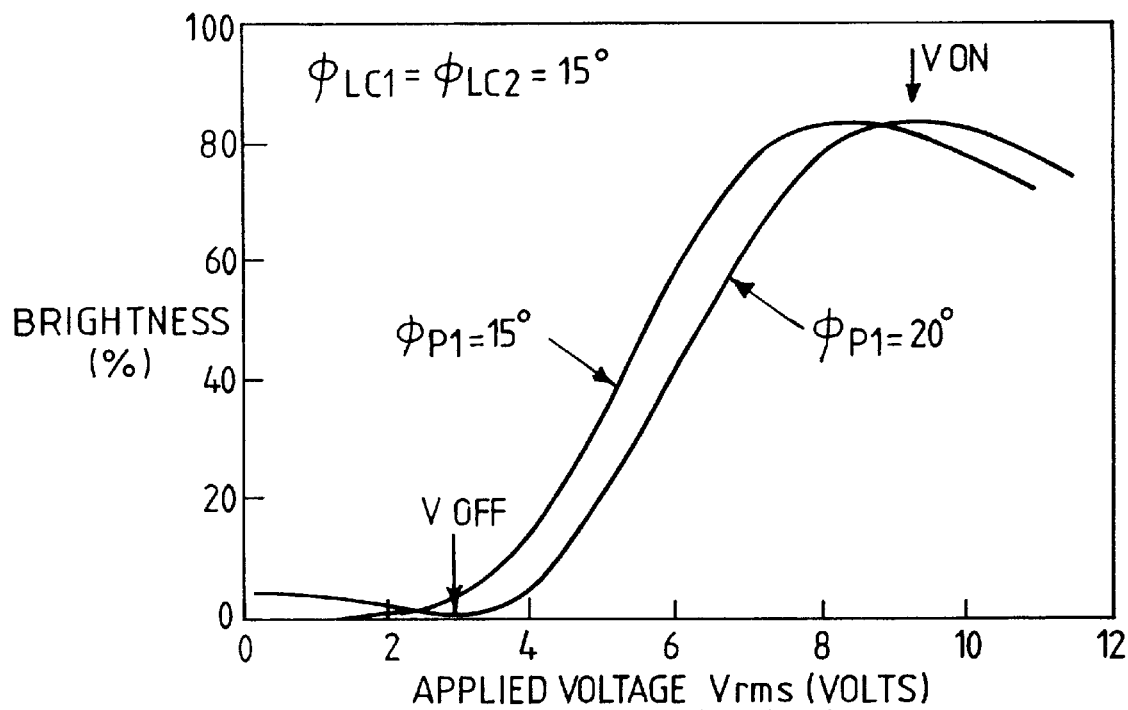
FIGS. 13(a) and 13(b) are graphs illustrating the electro-optical characteristics of embodiments in which polarizing plates are arranged so that the dark state can be obtained by applying a small non-zero electric field.
Figure 13B:
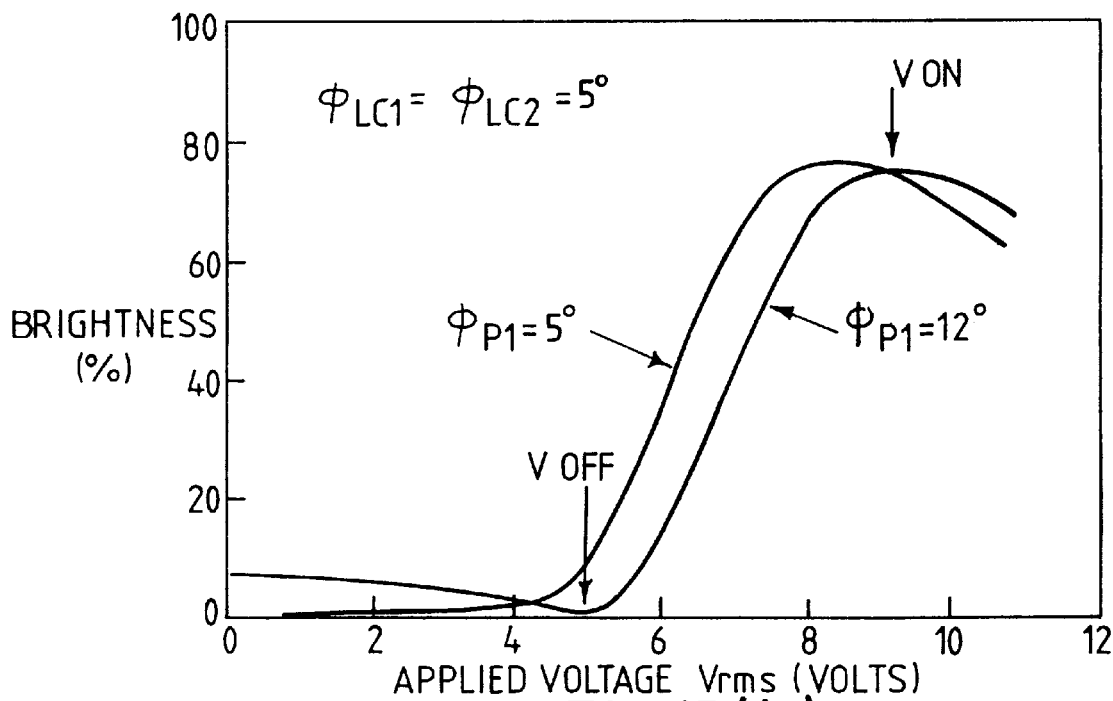

The results of measurement of the electro-optical characteristics in these embodiments are shown in FIG. 13. For the thirty-fourth embodiment, the voltage causing the dark state, $V_{OFF}$, may be 3.0 Volts and the voltage causing the maximum brightness, $V_{ON}$, was 9.2 Volts. Therefore, sufficiently high contrast can be obtained if its operation is performed with the voltage between $V_{OFF}$ and $V_{ON}$. Similarly, for the thirty-fifth embodiment, $V_{OFF}$ may be 5.0 Volts and $V_{ON}$ may be 9.0 Volts. When it is operated with a voltage between $V_{OFF}$ and $V_{ON}$, suitable display characteristics for both brightness and visual angle can be obtained, as in the other embodiments. The liquid crystal orientation is satisfactory and no orientation failure domain is generated.

EMBODIMENT 36

The structure of the thirty-sixth embodiment is the same as the thirty-fourth embodiment except as will be described below.

In the thirty-sixth embodiment, image signals are supplied to the signal electrode and at the same time, an alternating current at 3.0 V is applied to the common electrode. As a result, there is a reduction of the voltage which is to be supplied to the signal electrode (8.3 V→6.2 V). As its operation is performed with the voltage between $V_{OFF}$ and $V_{ON}$, satisfactory display characteristics in both brightness and visual angle can be obtained, as in the other embodiments. The liquid crystal orientation is satisfactory and no orientation failure domain is generated.

EMBODIMENT 37

The structure of the thirty-seventh embodiment is the same as the first embodiment except as will be described below.

In the thirty-seventh embodiment, the polarizing plates are arranged so that the dark state is obtained when an electric field of low level, not zero, is applied. The value of $|100_{LC1}-100_{P1}|$ can be set at 45 degrees and the value of $|100_{P2}-100_{P1}|$ can be set at 90 degrees. Therefore, a bright state is obtained by applying a low voltage and dark state can be obtained by applying a high voltage. The results of measurement of the voltage dependence of the brightness in this present embodiment is shown with a solid line in FIG. 14. Satisfactory display characteristics for both brightness and visual angle are obtained, as in the other embodiments. The contrast ratio is 35. The liquid crystal orientation is satisfactory, and no orientation failure domain is generated.

EMBODIMENT 38

With the structure of the thirty-seventh embodiment, a birefringent medium (uniaxially stretched polyvinyl alcohol film) is inserted between the two polarizing plates for compensating the interface residual phase difference. The stretched direction of the film $100_R$ is −45 degrees, and the stretched direction crosses over perpendicularly to the transmission axis of the polarized plate. The phase difference $R_f$ is 15 nm.

Figure 14:
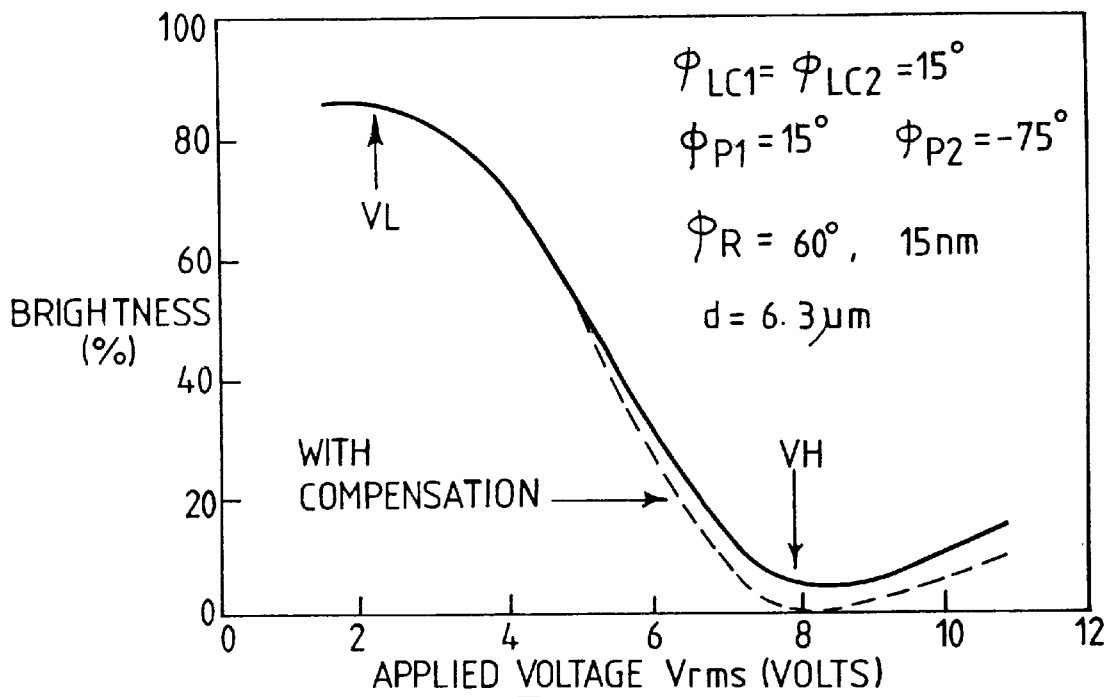
FIG. 14 is a graph illustrating the characteristics of a normally open type device and the characteristics when its residual phase difference at the interface is compensated.

As shown by a dotted line in FIG. 14, the light leakage at high voltage is suppressed more than in the thirty-seventh embodiment, and the contrast ratio is improved to 150. In accordance with the present invention, it is possible to provide:

i) firstly, a thin film transistor type liquid crystal display device, having a high contrast without using a transparent electrode, which can be mass-produced with high yields at low cost by using inexpensive manufacturing facilities;

ii) secondly, a thin film transistor type liquid crystal display device having satisfactory visual angle characteristics which can easily display multiple-tone images;

iii) thirdly, a thin film transistor type liquid crystal display device having a large margin for the processes of the liquid crystal orientation and materials, so that the device can have a large aperture factor, improved light transmission, and brighter images;

iv) fourthly, a thin film transistor type liquid crystal display device having a large aperture factor, improved light transmission, and brighter images by providing simple structures for the thin film transistor structure.

These advantages may be achieved independently or in combination depending on the structure of the device.

What is claimed is:

1. A liquid crystal display device comprising:

a pair of substrates;

a liquid crystal layer interposed between said pair of substrates;

a plurality of first common electrodes which extend in a direction and being formed on one substrate of said pair of substrates;

a second common electrode connected to two of said first common electrodes and having a first edge adjacent said plurality of first common electrodes and a second edge opposite to said plurality of first common electrodes;

a first pixel electrode, formed between two of said plurality of first common electrodes and extending in the same direction as the direction of said plurality of first common electrodes; and a second pixel electrode overlapping said second common electrode, connected to said first pixel electrode and covering at least a portion of the first edge of said second common electrode.

2. A liquid crystal display according to claim 1, further comprising:

a scanning wiring extending in parallel to said second common electrode;

a signal wiring extending in parallel to said first pixel electrode; and a three-terminal switching element having a gate connected to the scanning wiring, a source connected to the scanning wiring and a drain connected to said second common electrode.

3. A liquid crystal display according to claim 2, wherein a width of said second pixel electrode is larger than a width of said second common electrode.

4. A liquid crystal display according to claim 2, wherein said second common electrode is made of aluminum.

5. A liquid crystal display device comprising:

a pair of substrates;

a liquid crystal layer interposed between said pair of substrates;

a plurality of first common electrodes extending in a direction and being formed on one substrate of said pair of substrates;

a second common electrode connected to two of said plurality of first common electrodes and having a first edge adjacent said plurality of said first common electrodes and a second edge opposite to said plurality of first common electrodes;

a first pixel electrode, formed between two of said plurality of first common electrodes and extending in the same direction as the direction of said plurality of first common electrodes; and a second pixel electrode overlapping said second common electrode, connected to said first pixel electrode and covering at least a portion of the first edge of said second common electrode;

wherein an electric field is generated in said liquid crystal layer by applying a voltage between said first pixel electrode and said one of said plurality of first common electrodes.

6. A liquid crystal display according to claim 5, further comprising:

a scanning wiring extending in parallel to said second common electrode;

a signal wiring extending in parallel to said first pixel electrode; and a switching element having a gate connected to the scanning wiring, a source connected to the scanning wiring and a drain connected to said second common electrode.

7. A liquid crystal display according to claim 6, wherein a width of said second pixel electrode is larger than a width of said second common electrode.

8. A liquid crystal display according to claim 6, wherein said second common electrode is made of aluminum.

9. A liquid crystal display apparatus comprising:

a pair of substrates; and a liquid crystal layer interposed between said pair of substrates, wherein:

a substrate of said pair of substrates is provided with plural scanning signal electrodes;

plural image signal electrodes extending in one direction are arranged to intersect said plural scanning signal electrodes extending in another direction in a matrix form; and a plurality of thin film transistors are formed at locations corresponding to respective crossing points of said plural image signal electrodes and said plural scanning signal electrodes;

at least a respective pixel is composed in respective regions surrounded by said plural scanning electrodes and said plural image signal electrodes;

wherein a respective pixel is provided with a common electrode having plural portions extending in a same direction as the one direction of extension of said image signal electrodes and having plural portions extending in a same direction as the another direction of extension of said scanning signal electrodes, and a pixel electrode which is connected to an associated thin film transistor has plural portions extending in a same direction as the one direction of extension of said image signal electrodes and has plural portions extending in a same direction as the another direction of extension of said scanning signal electrodes; and wherein an insulator is interposed between said portions of the said common electrode extending in the same direction as the another direction of extension of said scanning signal electrodes and said portions of said pixel electrode extending in the same direction as the another direction of extension of said scanning signal electrodes.

10. A liquid crystal display apparatus according to claim 9, wherein a width of said portions of said pixel electrode extending in the same direction as the another direction of extension of said scanning signal electrodes is larger than a width of said portions of said common electrode in the same direction as the another direction of extension of said scanning signal electrodes.

* * * * *